US008106924B2

(12) United States Patent
Aliprandi et al.

(10) Patent No.: US 8,106,924 B2
(45) Date of Patent: Jan. 31, 2012

(54) METHOD AND SYSTEM FOR VIDEO RENDERING, COMPUTER PROGRAM PRODUCT THEREFOR

(75) Inventors: Davide Aliprandi, Volongo (IT); Emiliano Mario Piccinelli, Cavenago di Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 807 days.

(21) Appl. No.: 12/184,076

(22) Filed: Jul. 31, 2008

(65) Prior Publication Data

US 2010/0026712 A1   Feb. 4, 2010

(51) Int. Cl.
*G09G 5/00* (2006.01)
*G06T 15/10* (2011.01)
*G06T 15/20* (2011.01)

(52) U.S. Cl. ........................ 345/629; 345/427
(58) Field of Classification Search .......... 345/418–428, 345/429
See application file for complete search history.

(56) References Cited

U.S. PATENT DOCUMENTS

| 6,466,207 | B1 * | 10/2002 | Gortler et al. ............ 345/427 |
| 6,677,945 | B2 * | 1/2004 | Lapidous et al. ......... 345/422 |
| 6,970,591 | B1 * | 11/2005 | Lyons et al. ............. 382/154 |
| 2002/0158873 | A1 * | 10/2002 | Williamson .............. 345/427 |
| 2008/0007559 | A1 * | 1/2008 | Kalaiah et al. ........... 345/501 |
| 2009/0073324 | A1 * | 3/2009 | Tan et al. ................ 348/745 |

FOREIGN PATENT DOCUMENTS
EP   1 764 837 A1   3/2007

OTHER PUBLICATIONS

Kitahara et al., "Report of Core Experiment on View Interpolation (Multi-view Video Coding CE3)," *NTT Corporation, Nagoya University*, Document No. JVT-T119, 20th Meeting: Klagenfurt, Austria, Jul. 15-21, 2006, pp. 1-8.
Merkle et al., "MVC: Experiments on Coding of Multi-view Video plus Depth," *Fraunhofer HHI*, Document No. JVT-X064, 24th Meeting: Geneva, CH, Jun. 29-Jul. 5, 2007, pp. 1-12.
Senoh et al., "Consideration of image depth information," *National Institute of Information & Communication Technology*, Document No. JVT-X053, 24th Meeting: Geneva, CH, Jun. 29-Jul. 5, 2007, pp. 1-21.
Vetro, "JVT-X103 Summary of BoG Discussions on MVC," Geneva, CH, Jul. 2007, pp. 1-10.
Zhang, "A Flexible New Technique for Camera Calibration," *Microsoft Research, Microsoft Corporation*, Redmond, Washington, Technical Report MSR-TR-98-71, Aug. 10, 2002, pp. 1-21.
Zitnick et al., "High-quality video view interpolation using a layered representation," Interactive Visual Media Group, Microsoft Research, Redmond, Washington, Aug. 2004, pp. 1-9.
Buehler et al., "Unstructured Lumigraph Rendering," *ACM SIGGRAPH 2001*, Los Angeles, CA, Aug. 12-17, 2001, 425-432.
Fehn et al., "An Evolutionary and Optimised Approach on 3D-TV," *Proc. of IBC 2002*, Int. Broadcast Convention, Amsterdam, Netherlands, Sep. 2002, 9 pages.
Felzenszwalb et al., "Efficient Graph-Based Image Segmentation." *International Journal of Computer Vision* 59(2):167-181, 2004.

(Continued)

*Primary Examiner* — Ryan R Yang
(74) *Attorney, Agent, or Firm* — Lisa K. Jorgenson; Timothy L. Boller; Seed IP Law Group PLLC

(57) ABSTRACT

A method of rendering video frames starting from source frames of a scene acquired using a multi-viewpoint camera system including a Free Viewpoint Video (FVV) synthesizing process.

50 Claims, 7 Drawing Sheets

OTHER PUBLICATIONS

Fusiello et al., "A compact algorithm for rectification of stereo pairs," *Machine Vision and Applications* 12:16-22, 2000.

Glasenhardt, "Tele-immersion in eCommerce," 2003, 5 pages.

Ho et al., "CE6: View Interpolation Prediction for Multi-view Video Coding," *Joint Video Team (JVT) of ISO/IEC MPEG & ITU-T VCEG 23$^{rd}$ Meeting*, San Jose, California, Apr. 21-27, 2007, 11 pages.

Ho et al., "CE3: Depth Map Generation and Depth Map Coding for MVC," *Joint Video Team (JVT) of ISO/IEC MPEG & ITU-T VCEG 24$^{th}$ Meeting*, Geneva, Switzerland, Jun. 29-Jul. 5, 2007, 7 pages.

Ho et al., "Geometrical Compensation for MVC," *Joint Video Team (JVT) of ISO/IEC MPEG & ITU-T VCEG 24$^{th}$ Meeting*, Geneva, Switzerland, Jun. 29-Jul. 5, 2007, 8 pages.

Kauff et al., "Depth map creation and image-based rendering for advanced 3DTV services providing interoperability and scalability," *Signal Processing: Image Communication* 22:217-234, 2007.

Kimata et al., "Prediction structure for free viewpoint TV," *Joint Video Team (JVT) of ISO/IEC MPEG & ITU-T VCEG 22$^{nd}$ Meeting*, Marrakech, Morocco, Jan. 13-19, 2007, 7 pages.

Lee et al., "CE11: Illumination Compensation," *Joint Video Team (JVT) of ISO/IEC MPEG & ITU-T VCEG 21$^{st}$ Meeting*, Hangzhou, China, Oct. 20-27, 2006, 14 pages.

Martinian et al., "Extensions of H.264/AVC for Multiview Video Compression," *Mitsubishi Electronic Research Laboratories*, Jun. 2006, 7 pages.

Martinian et al., "View Synthesis for Multiview Video Compression," *Mitsubishi Electronic Research Laboratories*, May 2006, 8 pages.

Meesters et al., "A Survey of Perceptual Evaluations and Requirements of Three-Dimensional TV," *IEEE Transactions On Circuits and Systems For Video Technology* 14(3):381-391, 2004.

Merkle et al., "Efficient Compression of Multi-View Video Exploiting Inter-View Dependencies Based On H.264/MPEG4-AVC," *ICME 2006*: 1717-1720, 2006.

Onural et al., "An assessment of 3DTV Technologies," 3DTV Conference, Kos, Kos Island, Greece, May 2007.

Muller et al., "Reliability-based Generation and View Synthesis in Layered Depth Video," *Proc. IEEE Workshop on Multimedia Signal Processing, MMSP2008* 90:34-39, 2008.

Pandit et al., "JMVM 4 software," *Joint Video Team (JVT) of ISO/IEC MPEG & ITU-T VCEG 23$^{rd}$ Meeting*, San Jose, California, Apr. 21-27, 2007, 1 page.

Schreer et al. (eds.) *3DTV Videocommunication. Algorithms, concepts, and real-time systems in human centred communication* Wiley, 2005.

Shim et al., "CE5 Results—Joint Proposal for MVC Deblocking," *Joint Video Team (JVT) of ISO/IEC MPEG & ITU-T VCEG 23$^{rd}$ Meeting*, San Jose, California, Apr. 21-27, 2007, 18 pages.

Shimizu et al., "New View Synthesis Prediction Framework using Residual Prediction," *Joint Video Team (JVT) of ISO/IEC MPEG & ITU-T VCEG 23$^{rd}$ Meeting*, San Jose, California, Apr. 21-27, 2007, 8 pages.

Shimizu et al., "CE3: MVC global depth map estimation," *Joint Video Team (JVT) of ISO/IEC MPEG & ITU-T VCEG 24$^{th}$ Meeting*, Geneva, Switzerland, Jun. 29-Jul. 5, 2007, 8 pages.

Shimizu et al., "MVC view synthesis residual prediction," *Joint Video Team (JVT) of ISO/IEC MPEG & ITU-T VCEG 24$^{th}$ Meeting*, Geneva, Switzerland, Jun. 29-Jul. 5, 2007, 7 pages.

Shoemake, "Animating Rotation with Quaternion Curves," *ACM SIGGRAPH* 19 (3):245-254, San Francisco, California, Jul. 22-26, 1985.

Smolic et al., "Interactive 3D Video Representation and Coding Technologies," *Proceedings of the IEEE, Special Issues on Advances in Video Coding and Delivery* 93(1): 98-110 Jan. 2005.

Smolic et al., "3D Video and Free Viewpoint Video—Technologies, Applications and MPEG Standards," *Proc. ICME 2006, International Conference on Multimedia and Expo*, Toronto, Ontario, Jul. 9-12, 2006, pp. 2161-2164.

Smolic et al., "Multi-view video plus depth (MVD) format for advanced 3D video systems," *Joint Video Team (JVT) of ISO/IEC MPEG & ITU-T VCEG 23$^{rd}$ Meeting*, San Jose, California, Apr. 21-27, 2007, 10 pages.

Su et al., "Common Test Conditions for Multiview Video Coding," *Joint Video Team (JVT) of ISO/IEC MPEG & ITU-T VCEG 20$^{th}$ Meeting*, Klagenfurt, Austria, Jul. 15-21, 2006, 3 pages.

Tanimoto, "Overview of free viewpoint television," *Signal Processing: Image Communication* 21:454-461, 2006.

Tanimoto et al., "Proposal on Requirements for FTV," *Joint Video Team (JVT) of ISO/IEC MPEG & ITU-T VCEG 23$^{rd}$ Meeting*, San Jose, California, Apr. 21-27, 2007, 14 pages.

Ugur et al., "On Parallel Encoding/Decoding of MVC," *Joint Video Team (JVT) of ISO/IEC MPEG & ITU-T VCEG 21$^{st}$ Meeting*, Hangzhou, China, Oct. 20-27, 2006, 13 pages.

Vetro et al., "Joint Multiview Video Model (JMVM) 4.0," *Joint Video Team (JVT) of ISO/IEC MPEG & ITU-T VCEG 23$^{rd}$ Meeting*, San Jose, California, Apr. 21-27, 2007, 10 pages.

Vetro et al., "Joint Draft 3.0 on Multiview Video Coding," *Joint Video Team (JVT) of ISO/IEC MPEG & ITU-T VCEG 23$^{rd}$ Meeting*, San Jose, California, Apr. 21-27, 2007, 39 pages.

Wang et al., "Time-first coding for multi-view video coding," *Joint Video Team (JVT) of ISO/IUEC MPEG & ITU-TVCEG 21$^{st}$ Meeting*, Hangzhou, China, Oct. 20-27, 2006, 11 pages.

Wiegand et al., "Joint Draft 6," *Joint Video Team (JVT) of ISO/IEC MPEG & ITU-T VCEG 19$^{th}$ Meeting*, Geneva, Switzerland, Apr. 1-7, 2006, 538 pages.

Yea et al., "Report on Core Experiment CE3 of Multiview Coding," *Joint Video Team (JVT) of ISO/IEC MPEG & ITU-T VCEG 20$^{th}$ Meeting*, Klagenfurt, Austria, Jul. 15-21, 2006, 13 pages.

Yea et al., "Report of CE10 on View Synthesis Prediction," *Joint Video Team (JVT) of ISO/IEC MPEG & ITU-T VCEG 21$^{st}$ Meeting*, Hangzhou, China, Oct. 20-27, 2006, 6 pages.

Yea et al., "Report on CE10 on View Synthesis Prediction," *Joint Video Team (JVT) of ISO/IEC MPEG & ITU-T VCEG 22$^{nd}$ Meeting*, Marrakech, Morocco, Jan. 13-19, 2007, 7 pages.

Yea et al., "Report on CE6 on View Synthesis Prediction," *Joint Video Team (JVT) of ISO/IEC MPEG & ITU-T VCEG 23$^{rd}$ Meeting*, San Jose, California, Apr. 21-27, 2007, 10 pages.

Yea et al., "CE3: Study of Depth Issues," *Joint Video Team (JVT) of ISO/IEC MPEG & ITU-T VCEG 24$^{th}$ Meeting*, Geneva, Switzerland, Jun. 29-Jul. 5, 2007, 9 pages.

International Telecommunication Union, "Series H: Audiovisual and Multimedia Systems Infrastructure of audiovisual services—Coding of moving video: Advanced video coding for generic audiovisual services," H.264, May 2003, 271 pages.

International Organization for Standardization ISO/IEC JTC 1/SC 29/WG 11, "Coding of Moving Pictures and Audio," N6051, Oct. 2003, 3 pages.

International Organisation for Standardisation ISO/IEC JTC1/SC29/WG11, "Coding of Moving Pictures and Audio," N7779, Jan. 2006, 10 pages.

ISO/IEC 14496—Oct. 2004, "Coding of audio-visual objects—Part 10: Advanced Video Coding" 2nd edition of the Final Draft International Standard (FDIS).

MPEG-2, Information Technology, "Generic coding of moving pictures and associated audio information: Video" ISO/IEC 13818-2, 2$^{nd}$ Edition, 2000.

ISO/IEC JTC1/SC29/WG11, "Updated Call for Proposal on Multiview Video Coding" Doc. N7567, Nice, France, Oct. 2005.

ISO/IEC JTC1/SC29/WG11, "Multi-view Video Coding Requirements" Doc. N8064, Montreux, Switzerland, Apr. 2006.

ISO/IEC JTC1/SC29/WG11, "Requirements on Multi-view Video Coding v.7" Doc. N8218, Klagenfurt, Austria, Jul. 2006.

ISO/IEC JTC1/SC29/WG11, "Multi-view Coding using AVC" Doc. M12945, Bangkok, Thailand, 2006.

Valgrind Home, URL=http://valgrind.org, retrieved on Jan. 26, 2011 from http://replay.waybackmachine.org/20080604180349/http://valgrind.org/, 2 pages.

ETH Zurich, Blue-c project, http://www.icvr.ethz.ch/vrai_german/projekte/fertigprojekte/bluecave/bluecave.html.

Philips WOWvx 42 details, http://www.business-sites.philips.com/3dsolutions/3dtechnology/Index.html.

Sharp Actius RD3D 15 details, http://sharp-world.com/products/device/about/technology/lcd-03.html.
Pastoor, "3D Displays" in Schreer et al. (eds.), *3D Video Communication*, Wiley, 2005, pp. 235-260.

Microsoft® Research, http://research.microsoft.com/ivm/3D Video Download/.

* cited by examiner

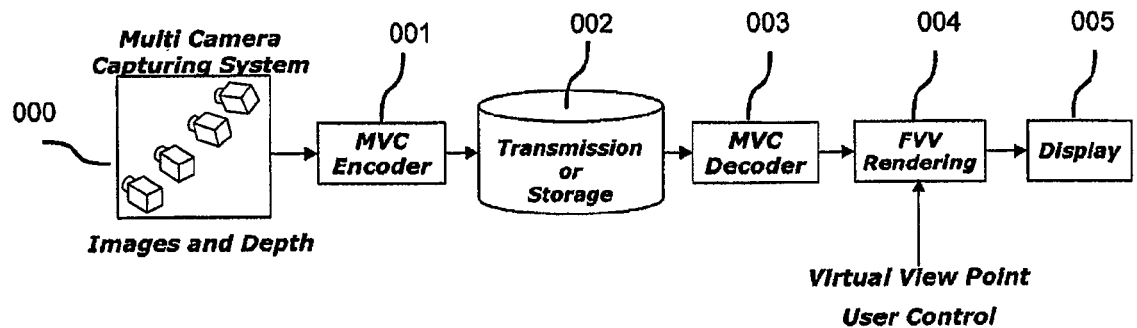
FIG. 1.a
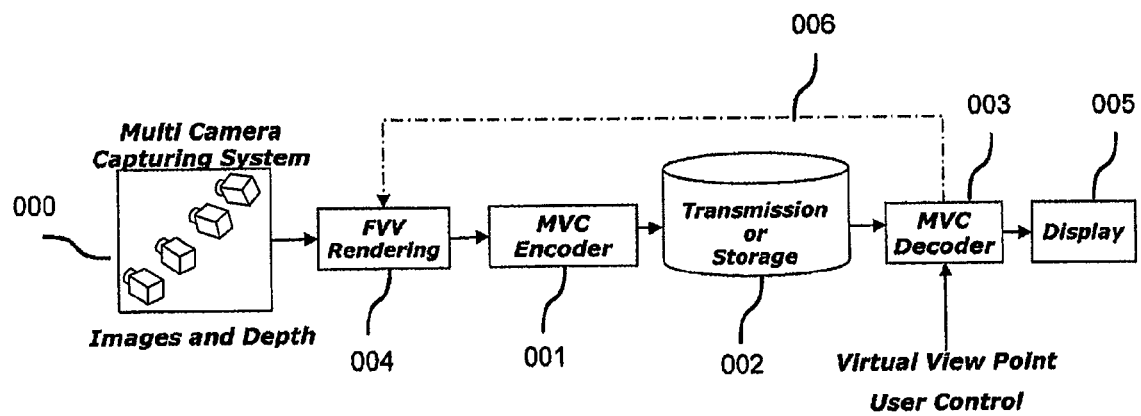
FIG. 1.b
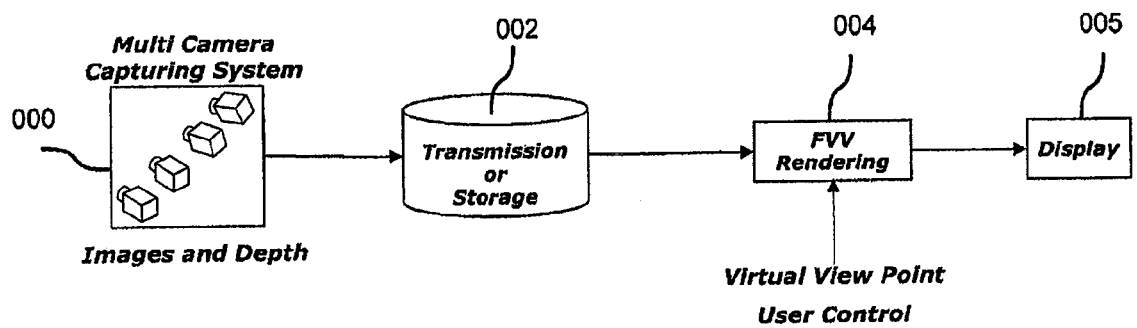
FIG. 1.c

METHOD AND SYSTEM FOR VIDEO RENDERING, COMPUTER PROGRAM PRODUCT THEREFOR

BACKGROUND

1. Technical Field

This disclosure relates to techniques for video rendering. This disclosure was developed with attention paid to its possible use, e.g., in video reproducing systems arranged upstream of a display device capable of receiving as an input a video data stream.

2. Description of the Related Art

Free Viewpoint Video (FVV) is a designation for the capability of a rendering engine to interactively control the viewpoint while rendering/displaying a video signal.

Three-Dimensional Video (3DV) is a designation for the capability of a display system/device to provide the viewer with a 3D impression while watching a video.

FVV represents one of the most exciting applications of next-generation television, adding a further degree of freedom to the usual way of watching TV.

For instance, the paper by C. L. Zitnick, S. B. Kang, M. Uyttendaele, S. Winder, and R. Szeliski, "High-Quality Video View Interpolation Using a Layered Representation", ACM SIGGRAPH and ACM Trans. on Graphics, Los Angeles, Calif., USA, August 2004 describes a multi-camera system to simultaneously capture a dynamic scene and rendering algorithms which allow synthetic viewpoints to be generated on-the-fly during a real-time user interaction session.

The techniques available to obtain such an effect can be classified in two basic families, namely:

Model-based Rendering, which operates on a geometrical model of the scene and transforms it by means of Computer Graphics (CG);

Image-based Rendering, which operates at the pixel-level and warps the image by using some kind of information related to the distance of the scene from the camera.

The former approach is usually more expensive from a computational point of view, as it may use a graphic card to perform the great amount of computation, and is obviously more suitable for managing synthetic data than real-world scenes.

The latter approach treats each pixel separately, and operates within a framework where no mathematical models are used to describe entities. Hence it is more suitable for real-word scenes.

The 3DV functionality can be achieved in the same way of the FVV by taking into consideration the principle of stereoscopy: a three-dimensional impression may be obtained by conveying to the viewer's eyes two adjacent views of the same scene related to two different positions located approximately 6.5 centimeters from each other, which corresponds to the average distance between a human's eyes.

BRIEF SUMMARY

In one embodiment, a method of executing a free viewpoint video synthesis process of video frames starting from source frames belonging to source viewpoints of a scene acquired using a multi-viewpoint camera system, includes: defining at least one target virtual viewpoint for the synthesis and computing a corresponding projection matrix for the target virtual viewpoint; computing a corresponding projection matrix for each source viewpoint; projecting pixels of the source frames from the source viewpoints to the target virtual viewpoint as respective contributions to a resulting video frame, wherein the projecting uses the projection matrixes corresponding to the source viewpoints and the target virtual viewpoint; and merging the contributions to the resulting video frame. In one embodiment, the method includes filling occlusions and combating artifacts in the resulting video frame. In one embodiment, the method further comprises computing the projection matrix corresponding to the target virtual viewpoint each time the target virtual viewpoint changes during a video sequence. In one embodiment, the method further comprises extracting depth information from the source frames and projecting pixels from the source frames to the target virtual viewpoint by using the depth information. In one embodiment, the extracting depth information from the source frames comprises using a segmentation algorithm of stereo views of the source frames. In one embodiment, the method includes projecting pixels from the source frames to the target virtual viewpoint by using a Pinhole Camera Model (PCM). In one embodiment, the method further comprises a filtering operation to mask remaining artifacts and reducing pixelation effects due to the projecting in the resulting video frame. In one embodiment, the merging the contributions to the resulting video frame comprises blending the contributions with relative weights with respect to the target virtual viewpoint. In one embodiment, the blending is selected out of a group consisting of: uniform blending, wherein the contributions are uniformly weighed; non-uniform blending, wherein the contributions are weighed as a function of the distance of the corresponding source viewpoints to the target virtual viewpoint; and layered blending, wherein those of the contributions equally close to the target virtual viewpoint are used to fill occlusions in a layer-by-layer fashion. In one embodiment, the blending comprises non-uniform blending which includes one of: weighing the contributions inversely of a respective distance to the target virtual viewpoint; weighing the contributions inversely of a respective squared distance to the target virtual viewpoint; and weighing the contributions inversely of the respective distance to the target virtual viewpoint by using binary coefficients. In one embodiment, the method further comprises modifying the binary coefficients and weighing the contributions by binary shifting. In one embodiment, the filling the occlusions is selected out of the group consisting of: pixel background filling, including identifying for each current pixel in an occluded area a neighboring pixel farthest in depth and filling the current pixel with a same color of the neighboring pixel thus identified; and area background filling, including identifying a pixel farthest in depth among the pixels in an occluded area and filling the pixels in an occluded area with a color of the pixel farthest in depth among them. In one embodiment, the method includes matting boundaries in combating the artifacts in the resulting video frame. In one embodiment, the matting the boundaries includes: searching discontinuities in depth values in the source frames, the discontinuities being between a pixel having a higher depth value and included in a foreground boundary, and a pixel having a lower depth value and included in a background boundary; merging the contributions of the pixels having lower depth values to define background boundaries in the frames; and applying matting on the background boundaries. In one embodiment, the matting the boundaries includes applying a parametric filter to reduce artifacts around objects in the source frames. In one embodiment, the filtering operation includes one of: an averaging filtering; and a Gaussian filtering. In one embodiment, the filtering operation includes parametric filtering. In one embodiment, the filtering operation includes a Gaussian filtering parametric in size and standard deviation. In one embodiment, the contributions include holes due to integer rounding in projecting pixels from the source frames, the method including filling the holes by assigning to a pixel or pixels in a hole an average value of pixels located at two extremities of the hole. In one embodiment, the method includes filling the holes after merging the contributions to the resulting video frame. In one embodiment, the combating artifacts in the resulting video frame includes selectively omitting projecting for pixels in borders around objects in the source frames. In one embodiment, the method includes making parametric a thickness of the borders for which projecting pixels is omitted. In one embodiment, the method includes locating color borders of moving objects in the source frames and applying the color borders onto the resulting video frame. In one embodiment, the method includes making parametric a thickness of the borders applied onto the resulting video frame. In one embodiment, applying the color borders includes one of: copying the color borders onto the resulting video frame; and averaging the color borders with an existing color in the resulting video frame. In one embodiment, projecting pixels from the source frames to the target virtual viewpoint includes, in a presence of a sequence of consecutive pixels in a same row or column of a source frame having a same depth value: computing a projection of a first and last pixel in the sequence; and when the consecutive pixels, once projected, have a same distance as in the source frame, copying all the other pixels in the sequence to the target virtual viewpoint between the two projected pixels. In one embodiment, the method includes: when the consecutive pixels, once projected, do not have the same distance, repeating the computing for a new sequence of consecutive pixels of a length half a length of the sequence; and when the consecutive pixels of the new sequence, once projected, have a same distance as in the source frame, copying all the other pixels in the new sequence to the target virtual viewpoint between the two projected pixels of the new sequence. In one embodiment, the method includes extracting depth information from the source frames and storing the depth information in integer format. In one embodiment, the method comprises displaying the resulting video frame.

In one embodiment, a method of executing a free viewpoint video synthesis process of video frames starting from source frames belonging to source viewpoints of a scene acquired using a multi-viewpoint camera system, comprises: defining at least one target virtual viewpoint for the synthesis and computing a corresponding projection matrix for the target virtual viewpoint; computing a corresponding projection matrix for each source viewpoint; projecting pixels of the source frames from the source viewpoints to the target virtual viewpoint as respective contributions to a resulting video frame using projection matrixes corresponding to the source viewpoints and the target virtual viewpoint; merging the contributions to the resulting video frame, with possible occlusions and artifacts deriving from the projecting and merging; filling the occlusions and combating the artifacts in the resulting video frame; and executing the free viewpoint synthesizing process of video frames twice for two target virtual viewpoints. In one embodiment, the method further comprises displaying the resulting video frame. In one embodiment, the method includes executing the free viewpoint synthesizing process twice for two viewpoints located approximately 6.5 centimeter apart from each other.

In one embodiment, a processing system for synthesizing video frames starting from source frames of a scene acquired using a multi-viewpoint camera system comprises: a virtual camera configured to define at least one target virtual viewpoint and compute a corresponding projection matrix for the target virtual viewpoint and a corresponding projection matrix for each source viewpoint; a projection module configured to project pixels of source frames from the source viewpoints to the target virtual viewpoint as respective contributions to a resulting video frame using the projection matrixes; a merging module configured to merge the contributions to the resulting video frame; an occlusion solving module configured to fill occlusions in the resulting video frame; and an artifact combating module configured to combat artifacts in the resulting video frame. In one embodiment, the artifact combating module comprises a boundary matting stage configured to mat boundaries. In one embodiment, the projection module is configured to selectively omit projecting for pixels in borders around objects in the source frames under control of the artifact combating module. In one embodiment, the system includes a filtering module configured to mask remaining artifacts and reduce pixelation effects due to the projecting in the resulting video frame. In one embodiment, the system is configured in a form of a pipelined processor. In one embodiment, a first stage in the pipelined processor includes the virtual camera and the projection module; a second stage in the pipelined processor includes the merging module; and a third stage in the pipelined processor includes the occlusion solving stage. In one embodiment, the third stage in the pipelined processor further incorporates a boundary matting module configured to mat boundaries in combating artifacts in the resulting video frame. In one embodiment, the third stage in the pipelined processor further incorporates a filtering module configured to mask remaining artifacts and reduce pixelation effects due to the projecting in the resulting video frame.

In one embodiment, a computer program product is loadable in a memory of at least one computer and includes software code portions for performing a method of rendering video frames starting from source frames of source viewpoints of a scene acquired from a multi-viewpoint camera system, the method comprising: defining at least one target virtual viewpoint for synthesis and computing a corresponding projection matrix for the target virtual viewpoint; computing a corresponding projection matrix for each source viewpoint; projecting pixels of the source frames from the source viewpoints to the target virtual viewpoint as respective contributions to a resulting video frame, wherein the projecting uses the projection matrixes corresponding to the source viewpoints and the target virtual viewpoint; and merging the contributions to the resulting video frame. In one embodiment, the method includes filling occlusions and combating artifacts in the resulting video frame.

In one embodiment, a video rendering system to render video from source frames acquired from a multi-viewpoint camera system comprises: a projection module configured to compute virtual camera projection matrices and project pixels into target virtual viewpoints based on the virtual camera projection matrices; and a blending module configured to blend together contributions of multiple source views to obtain output frames. In one embodiment, the rendering system further comprises a refinement module configured to fill occlusions in the output frames. In one embodiment, the projection module is configured to detect boundaries of input texture frames. In one embodiment, the projection module is configured to project pixels into target virtual viewpoints based on depth information. In one embodiment, the refinement module is configured to filter the output frames. In one embodiment, the refinement module is configured to process boundary information to mask artifacts. In one embodiment, the projection module is configured to project pixels to a target virtual viewpoint based on a set of projection matrixes including a projection matrix for each source view corresponding to the target virtual viewpoint.

In one embodiment, a method of rendering video frames starting from source frames of a scene acquired using a multi-viewpoint camera system comprises: defining at least one target virtual viewpoint for rendering and computing a corresponding projection matrix for the video frames to the target virtual viewpoint; projecting pixels from the source frames to the target virtual viewpoint as respective contributions to a resulting video frame, wherein the projecting is based on the projection matrix; merging the contributions to the resulting video frame; and filling occlusions and combating artifacts in the resulting video frame.

In one embodiment, a method of rendering video frames starting from source frames of a scene acquired using a multi-viewpoint camera system includes a Free Viewpoint Video (FVV) synthesizing process. In one embodiment, the process includes: defining a target virtual viewpoint for rendering and computing a corresponding projection matrix; computing a corresponding projection matrix for each of the source viewpoints; projecting the pixels of the source frames from the source viewpoints to the target virtual viewpoint as respective contributions to a resulting video frame; merging the various contributions to the resulting video frame, with possible occlusions and artifacts deriving from the projecting and merging; filling the occlusions and combating artifacts in the resulting video frame. In one embodiment, the FVV synthesizing process can be executed twice for two target virtual viewpoints, once for each of a viewer's eyes, to produce a Three Dimensional Video (3DV) to obtain a joint FVV-3DV functionality.

An object of an embodiment is to provide an improvement of the techniques discussed in the foregoing, especially in connection with, but without limitation to, the possibility of jointly providing FVV and 3DV functionalities.

The claims are an integral part of the disclosure provided herein.

BRIEF DESCRIPTION OF THE SEVERAL VIEWS OF THE DRAWINGS

Embodiments will now be described, by way of example only, with reference to the enclosed views, wherein:

FIGS. 1.a, 1.b and 1.c are functional block diagrams of three different processing systems adapted to incorporate the arrangement described herein;

DETAILED DESCRIPTION

Figure 2:
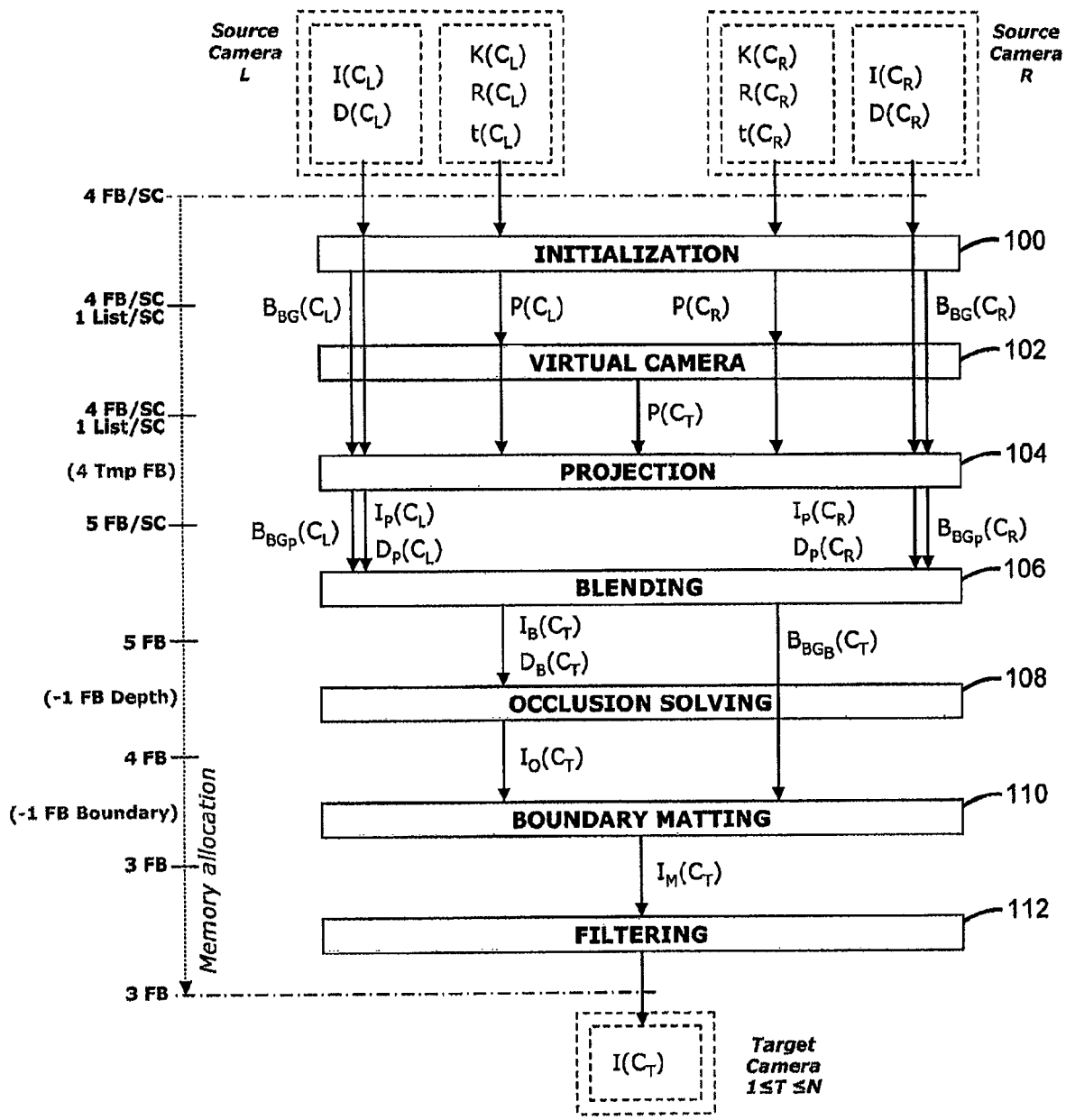
FIG. 2 is a functional block diagram representative of data flow in a rendering chain as described herein.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The capability of combining the functionalities of FVV and 3DV, with the possibility of rendering a continuum of views by realizing a sort of "time-slice effect" (frozen in time) and "bullet-time effect" (hyper-slow-motion),—with three-dimensional rendering—is attractive, especially from a commercial viewpoint, e.g., for the entertainment industry. Within this framework, it would be possible to control the "permutation" of time (e.g., to show normally imperceptible and un-filmable events, such as flying bullets) and space (by varying the camera's angle, i.e., causing the viewers' point of view to move around the scene at a normal speed while events are slowed down).

This result is almost impossible to achieve with conventional slow-motion, as the physical camera would have to move impossibly fast. This means that only a "virtual" camera would be capable of "filming" (actually, "synthesizing") bullet-time types of moments. Such functionality finds application, e.g., in movies, where the bullet-time effect has been achieved photographically in the past by resorting to a set of still cameras surrounding the subject. The cameras are triggered simultaneously or sequentially and individual frames taken from each of the still cameras are then arranged and displayed consecutively to produce an orbiting viewpoint of action.

This technique suggests the limitless perspectives and variable frame rates possible with a virtual camera. However, still array processing as performed with real cameras is often limited to assigned paths. For instance, in the movie "The Matrix", an improved version of an old-art photographic technique known as "time-slice photography" was used. It consists in placing a large number of cameras around an object and making the cameras "fire" nearly simultaneously. Each camera is a still camera, not a motion-picture camera, and contributes one frame to the sequence. When the sequence of shots is viewed as a movie, the viewer sees what is in effect a set of two-dimensional slices of a three-dimensional scene as it happens in real life, e.g., while walking around a statue to see how it looks from different angles. Certain scenes the "The Matrix" feature the time-slice effect with completely frozen characters and objects.

Moreover, interpolation techniques have been used to improve fluidity in motion of a camera, and this effect had been further expanded to create the "bullet-time" effect, so that—rather than being completely frozen—the scene progresses with slow and variable motion.

From the point of view of display, modern 3D displays exploit the stereoscopy principle and can provide plural users with a head motion parallax effect. Each user may thus experience the effect of looking around objects in a 3D manner, as they were real.

Several technologies may be used to achieve this result, so-called "autostereoscopic" display systems being a case in point.

These display systems are based on the concept of displaying a continuum of views at the same time by using a specific pixel-plane pattern and a slanted lenticular screen capable of addressing the light beam of each view towards a specific direction. The viewer's eyes are reached by the correct couple of (stereo) views, so that each viewer can see the proper 3D scene with respect to his/her viewpoint.

The effect becomes broader as the number of views used increases; for instance, the autostereoscopic display system WOWvx 42" from Koninklijke Philips Electronics N.V. (Philips) of the Netherlands can show nine views at the same time.

Another way of producing a 3D effect is holographic technology. A system akin to a 3D holographic display is currently available from Holografika Kft. of Budapest, Hungary. This is a not purely holographic system that handles an enormous amount of redundant information; it is rather based on holographic geometrical principles with special focus on reconstructing the key elements of spatial vision. The pixels (or rather voxels) of the holographic screen emit light beams of different intensity and color to the various directions. A light-emitting surface composed of these voxels acts as a digital window capable of showing 3D scenes in a very effective way. Capturing and delivering so many original views may be highly inefficient and frequently hardly possible due to computational overhead. Using a compact 3D representation format that allows rendering a continuum of output views may be much more efficient.

Multi-view Video Coding (MVC) is an on-going standardization effort of the Joint Video Team (JVT) to extend the H.264/MPEG4-AVC standard by developing novel tools optimized for 3D and multi-view video use cases. Papers such as A. Vetro, "Summary of BoG Discussions on MVC", JVT-X103, Geneva, Swiss, July 2007 and Joint Video Team of ISO/IEC MPEG & ITU-T VCEG, "Report of core experiment on View Interpolation (Multi-view Video Coding CE3)", JVT-T119, Klagenfurt, Austria, July 2006 are exemplary of these efforts.

The two following activities are currently under development by JVT:

View Synthesis Prediction (VSP), to improve coding efficiency by using as prediction a synthesized version of an already existing view;

Intermediate View Synthesis by using Multi-view Video plus Depth (MVD) coding, to generate a novel view by means of some kind of depth information.

The same algorithms, i.e., depth-based 3D warping, can be generally applied for both cases, while a basic difference lies in the role of depth information.

In the case of VSP, depth is supplementary information to improve compression efficiency, and has little or no relevance for the generation of novel views at the decoder side. It is thus used to synthesize existing views starting from the already encoded views and to encode only the differences between a synthesized view and the corresponding original one (instead of the original one), in order to save the bitrate space. This is similar to motion vectors in conventional video coding. View synthesis does not need to be very realistic or high quality, as long as compression efficiency is improved.

As opposed thereto, in the case of MVD, the depth data enables the synthesis of novel views (from virtual cameras) at the decoder side to support a FTV functionality. The decoder receives complete depth data in sufficient quality available; hence, depth is an integral part of the data to be transmitted. A relationship may be shown to exist between MVC, MVD and the relative counterparts that perform also intermediate view synthesis. The view synthesis functionality may be very useful in saving bitrate space.

A description of a FVV/3DV rendering chain is given with particular attention to the data flow therein. An embodiment in the form of a pipelined rendering core is then discussed. Each core stage of the rendering process will then be described.

The example data flows illustrated in FIGS. 1.*a*, 1.*b* and 1.*c* are related to a sequence of steps/stages in embodiments of a process of acquiring source sequences and displaying them on a display device.

The rendering engine for view synthesis allows the user to interactively change his viewpoint while watching a video within a certain region of 3D space; synthesis of the virtual view is facilitated by the availability of the views taken at the source (e.g., in real time).

FIG. 1.*a* illustrates a possible embodiment consisting in a set of N Synchronous Source Cameras ("Multi Camera capturing system", 000) providing images and their related depth information to a Multi View Encoder (for example H.264/MVC—Multi View Coding—compliant) 001. Depth information denotes a map for each available frame associating each pixel with its own estimated or calculated distance from the camera which took it, expressed, for example, as a binary number (for example, with 8 bits per pixel). The bit stream produced by the encoder will then be sent through a transmission channel or stored on a storage device 002. On the other side, a compliant decoder 003 will receive and decode the stream; the obtained frames and depth information will then be processed by the "FW rendering" block 004, as described herein, and the obtained frames (or couples of frames, in case of 3D visualization) will be passed to the monitor 005 and shown to the user. The user can interact directly with the FVV rendering block 004 by selecting its desired viewpoint. In this embodiment, the "FW rendering" block 004 can, for example, be a post-processor of the decoder block (also integrated within it), a pre-processor of the display block (also integrated within it) or as stand-alone dongle (implemented with a hardware or software solution or a combination thereof), or as a combination thereof.

FIG. 1.*b* shows another embodiment: in this case, the "FW rendering" block works directly with the captured sequences and the virtual view point will be selected by the user through its own set-top-box 003 that will communicate to the FVV rendering block using a feedback channel 006.

FIG. 1.*c* shows a simplified embodiment similar to the embodiment of FIG. 1.*a*, but excluding the compression-transmission-decompression processes, so the "FW rendering" block 004 can directly work using the original sequences and depth information and provide the synthesized views to the display system 005.

FIG. 2 illustrates a FVV/3DV chain illustrative of an Image-based approach, where the input source data L (a sequence coming from a generic "Left" position) and R (a sequence coming from a generic "Right" position), provided for example directly provided by Synchronous Source Cameras or decoded by a dedicated decoder 003 or retrieved from a storage device 002, is a set of real-world frames including textures (real "displayable" image pixels) together with their associated depth information as described above (see FIG. 1.*a*). The exemplary process described herein for two "L" and "R" input sequences may be extended to any number M of input sequences, with 2<=M<=N, being "N" the total number of available source views.

The description provided by FIG. 2 is given at a high-level, in order to be very general and thus illustrative of many possible implementations, for example the followings:

hardware architectures like personal computer or complex GPU (Graphic Processing Unit) suitable to execute such methodology as a software program, dedicated hardware cell: which may, for example, be intended as a stand-alone product or integrated in a more complex system, such as a prepossessing block of a video encoder or a post-processing block of a video decoder (e.g., Set-Top-Box).

The example sequence of FIG. 2 assumes that video capture takes place by acquiring the scene by using a multi-view camera system, while also keeping track of the parameters related to the cameras. Depth information is assumed to be known as well, and may be, for example, computed by using any algorithm working on stereo views or acquired as well through the cameras themselves or through any external equipment devoted to this scope.

The rendering engine 004 as described below synthesizes the desired virtual frames/views with respect to the target application and the output form from the rendering step is finally displayed (with or without any extra processing in between, like further data compression/decompression, picture quality enhancement, etc.) onto a proper display, which may be bi-dimensional if the produced sequence is just a FVV sequence, three-dimensional otherwise.

The steps of encoding (data compression), transfer to the end point over a channel and selective data de-compression are bypassed if the target application does not require a content-transportation stage, for example, over a net.

FIG. 2 details an example procedure to synthesize a virtual viewpoint's frame, together with algorithms to perform each task.

This example procedure includes the following steps:
system initialization 100;
virtual camera definition 102: the desired virtual camera's projection matrix is computed (in some embodiments, this may occur only for the first frame generated in the same virtual viewpoint);
projection 104: for every available/specified source view (generally the most adjacent to the target viewpoint), all the pixels in a frame are projected to the target virtual camera, e.g., by using the Pinhole Camera Model (PCM—as better detailed in the following) and depth information;
blending 106: all the contributions are merged by taking into account their relative weight with respect to the target viewpoint (Target Camera $L \leq T \leq R$);
occlusion solving 108: the remaining occlusions are filled;
boundary matting 110: boundaries are matted to conceal artifacts due to projection and merging;
filtering 112: the frame produced is filtered to make it seem more realistic.

Such an approach facilitates merging the two functionalities of FVV and 3DV into a single rendering engine. This is because, once the free viewpoint synthesizing process is operative, the 3D effect can be obtained by executing the free viewpoint rendering twice, once for each of the viewer's eyes in parallel (simultaneously or at least approximately simultaneously, i.e., by resorting to time-division or resource division techniques).

The virtual camera step 102 uses a mathematical approach to compute a geometrically correct projection matrix consistent with the set of the existing cameras. The projection phase 104 may be treated in the same mathematical framework, and may be the most relevant stage computationally speaking.

The blending step 106 and the occlusion solving step 108 run the risk of producing artifacts in the final frame. Occlusion solving will thus "fill" smartly all the frame areas where no information about the content is available from anyone of the source views.

The filtering step 112 can improve the quality of the synthesized frame by masking artifacts and reducing the "pixelation" effect, giving to the frame the impression of being more realistic.

A processing sequence as described in the foregoing can be integrated in set top boxes and, more generally, in any video rendering system upstream of a display device adapted to take as an input a multi-view video stream (even of a "raw" type). Furthermore, it may also be implemented as a single stand-alone product cell.

Figure 3:
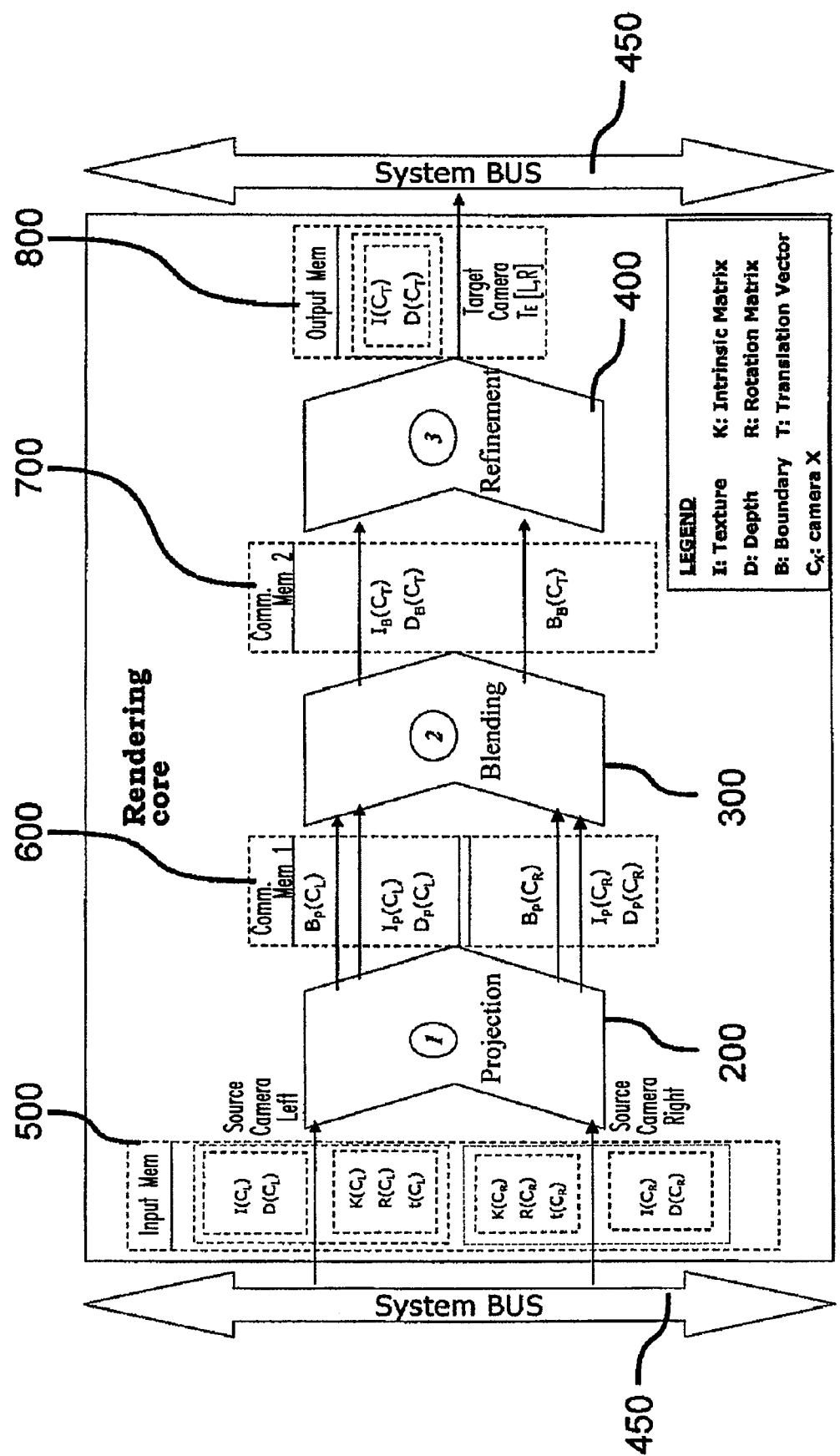
FIG. 3 is a block diagram representative of a rendering core as described herein.
Figure 4:
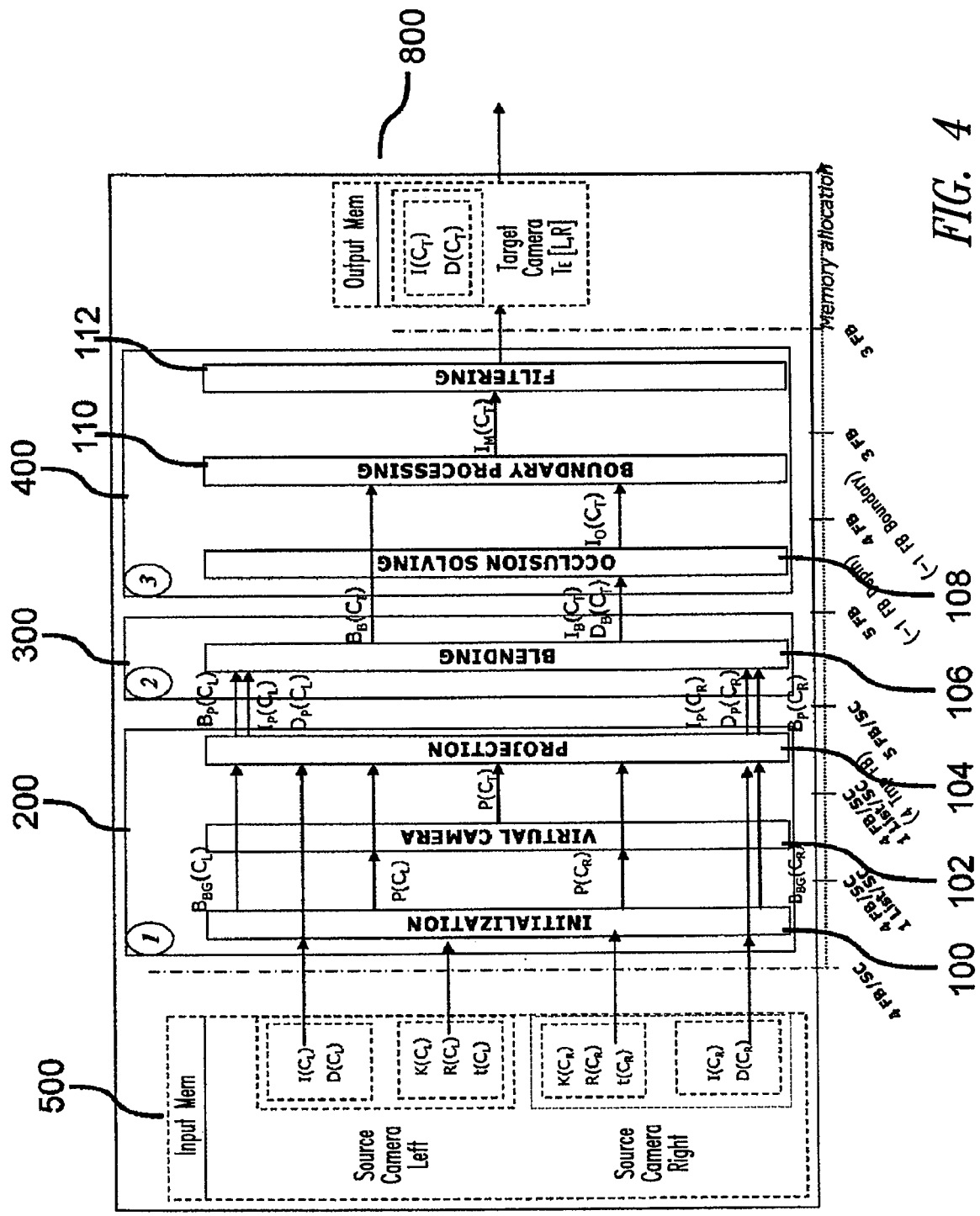
FIG. 4 is another functional block diagram representative of a possible implementation of the rendering data flow of FIG. 2 in a rendering core as depicted in FIG. 3.

FIGS. 3 and 4 are examples of the possibility of grouping the various processing steps of FIG. 2 in three main homogenous stages or phases, namely:
projection 200 (grouping initialization 100, virtual camera 102, and projection 104 of FIG. 2);
blending 300 (essentially corresponding to the blending step 106 of FIG. 2); and
refinement 400 (grouping occlusion solving 108, boundary processing 110, and filtering 112 of FIG. 2).

Various different hardware solutions can be resorted to for implementing such processing phases/steps.

FIG. 3 is an example embodiment of a rendering core in the form of HW 3-stage pipeline, where each stage in the pipeline implements one of the phases 200, 300, 400 described in the foregoing. FIG. 2 refers to an embodiment involving only two input views (i.e., "Left" and "Right"), without lack of generality with respect to the general case involving more input views.

In the block diagram of FIG. 3, references 500 and 800 denote input and output memories, respectively, arranged between the pipeline and the system bus 450. References 600 and 770 denote intermediate communication memories (Comm Mem 1—600 and Comm Mem 2—700) arranged between the stages in the pipeline. The system bus 450 is the main bus that connects the external memory rendering core.

The communication memories 600 and 700 decouple the processing units, facilitating full pipeline processing of data. In that way, as soon as processing an input is finished by writing the resulting output in its communication memory, each stage can start processing a subsequent chunk of data.

By way of example, at the beginning of processing (T=0) the projection stage 200 processes an input Frames0 (Left and Right) and writes the results to the communication memory 600. At time T=1, the blending stage 300 processes the previous output of the projection stage 200, while the projection stage 200 starts processing Frames1, and so on. At time T=3 the pipeline will be fully loaded: stage 400 will process the output of stage 300 related to Frames0, stage 300 will process the output of stage 200 related to Frames1, and stage 200 will process the input related to Frames2, and so on.

The projection stage 200 is configured to compute the virtual camera's projection matrix, detecting boundaries of the input texture frames, and projecting each pixel into the target virtual viewpoint by using projection matrixes and depth frames.

The blending stage 300 will blend together all the contributions of the source views to obtain a single frame.

The refinement stage 400 will process the texture frame to solve remaining occlusions and perform a filtering/boundary processing action to mask artifacts.

The functional block diagram of FIG. 4 highlights how the pipelined approach makes it possible to serialize the elementary stages of the rendering procedure. The data being processed increase their value step-by-step by progressing along the chain until the target viewpoint texture is obtained by also coping with real time requirements of processing. Specifically, FIG. 4 is representative of a pipelined processor architecture, including:
- a first stage 200 incorporating, in addition to the initialization stage 100, the virtual camera stage 102 and the projection stage 104,
- a second stage 300 incorporating the merging (blending) stage 300; and
- a third stage 400 incorporating the occlusion solving stage 108 (plus possibly the boundary processing and filtering stages 110 and 112).

The various processing steps/stages discussed in the foregoing will be further detailed in the following. By way of introduction, a brief overview will be provided of certain steps/stages which may be ancillary to certain embodiments of the arrangement described herein.

Video Capture

Recording a scene using a multi-view camera system may involve using plural devices. The cameras may be calibrated before each capture session. An effective calibration technique is described in Z. Zhang, "A flexible new technique for camera calibration", IEEE Transactions on Pattern Analysis and Machine Intelligence, 22, 11, 1330-1334. This technique is based on a calibration pattern mounted on a flat plate, which is moved around in front of all the cameras. The cameras may be synchronized making them shoot at the same time when required, as this leads to a consistent representation of the scene from all the defined viewpoints. The camera parameters are recorded so that the rendering engine can compute the projection matrix to the desired virtual viewpoint. The data may be stored on a high-speed storage device, even with the use of one or more concentrators, if the capture-rate is high.

Increasing the number of cameras will expand the 3D space covered, and reducing the spacing between the cameras will lead to fewer occlusions when rendering an intermediate view. Also, increasing the number of frames-per-second captured by the cameras will render time transitions smoother, while increasing the resolution of the cameras will result in a higher quality in the acquired scenery.

A set of two to twenty cameras may be typically used in a multi-camera recording system, but plural—camera configurations using many more cameras (e.g., 100 cameras arranged in linear, semi-circular, and planar arrays) may be employed.

Depth Extraction

Accurate depth information is an asset in providing an impressive FVV application. Embodiments may store the depth information of a recorded scene and address the problem of maintaining the information related to the size and distance from the camera of the actual object.

Two basic types of depth data representation, may, for example, be employed:
- disparity: this is also known as parallax information, which is the difference in displacement of the same object viewed from two different cameras;
- depth: this is the actual distance of the object from the camera.

Disparity can be extracted from a stereo image without measuring the actual object distance Z (depth): see, e.g., Joint Video Team of ISO/IEC MPEG & ITU-T VCEG, "Consideration of image depth information", JVT-X053, Geneva, Swiss, June 2007.

In a parallel camera situation, disparity d represents the ratio:

$$d = \frac{fB}{Z}$$

where f is the focal length and B is the distance between the two cameras baseline. When the object is at an infinite distance (this happens especially in natural scenes) the depth becomes infinite as well. For that reason, in some applications, the depth information is stored as the inverse of Z.

An intuitive relationship between these items of information is the following: in moving from one camera to another, the disparity in the screen pixel coordinates of an object between cameras depends on the depth of the object, that is an object closer to the camera will move much more than objects that are far from the camera.

At least two types of methods may be used for obtaining the depth information of a color scene, namely:
- range-cameras: these are cameras that extract the depth information directly while recording the scene, by emitting a modulated light to the object and measuring the phase (time) delay of the reflected light. This depth is measured by a single camera, and is independent of the camera baseline length or the camera's focal length;
- stereo-matching algorithms: for those (stereo) sequences not having an associated depth map, both of the information items above can be extracted from a couple of views of the same scene, by means of a stereo-matching algorithm. A mathematical framework defines the relationships describing the mapping between the pixels of the two source images.

For example, C. L. Zitnick, et al. (already cited) adopt a segmentation-based stereo-matching approach to extract depth data from the acquired color sequences, and save them as monochromatic sequences with 8-bit resolution. Moreover, they provide the cameras parameters as well as the mathematical expression of the function to convert the raw depth data p (pixel values representing a hyperbolic representation of Z) to the real-world depth Z:

$$Z = \frac{1}{\frac{p}{255}\left(\frac{1}{Z_{near}} - \frac{1}{Z_{far}}\right) + \frac{1}{Z_{far}}}.$$

In Joint Video Team of ISO/IEC MPEG & ITU-T VCEG, "MVC: Experiments on Coding of Multi-view Video plus Depth", JVT-X064, Geneva, Swiss, June 2007 illustrative examples of video plus depth format are given, made up of an image ad its associated 8-bits depth map.

The availability of this kind of data leads to the definition of MVD, i.e., "Multi-view Video plus Depth" (N textures plus N depths) representation. This is an extension of the conventional color video format, suitable for novel view synthesis, which enlarges the navigation range significantly: see again C. L. Zitnick, et al. (already cited) or P. Kauff, N. Atzpadin, C. Fehn, M. Muller, O. Schreer, A. Smolic, and R. Tanger, "Depth Map Creation and Image Based Rendering for Advanced 3DTV Services Providing Interoperability and Scalability", Signal Processing: Image Communication. Special Issue on 3DTV, February 2007.

Figure 5:
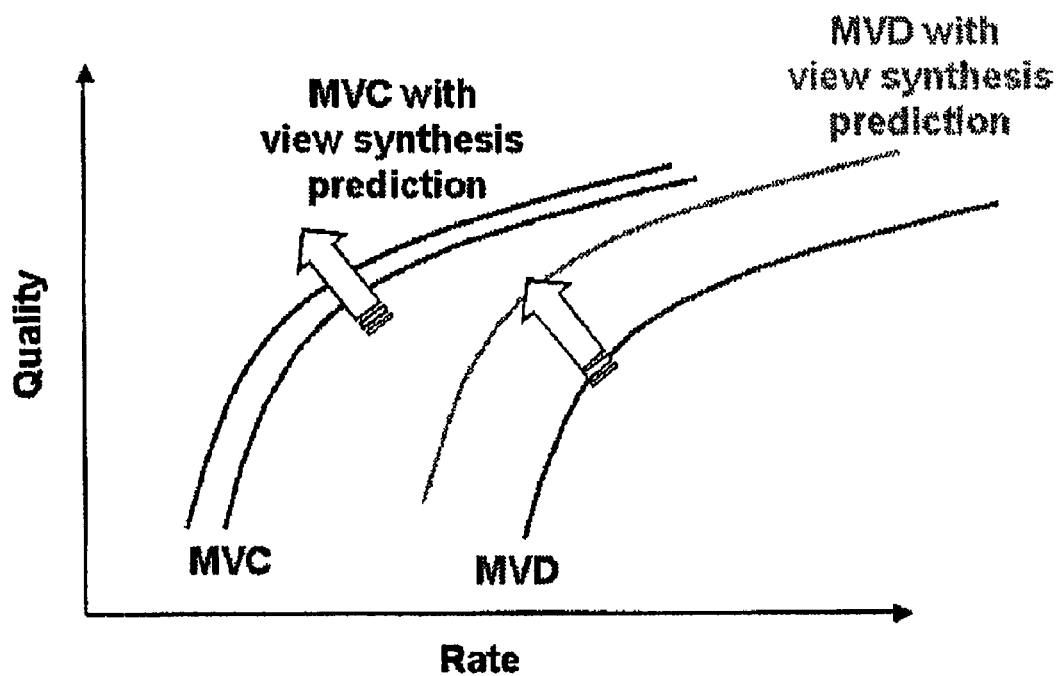
FIG. 5 is a comparative diagram of MVC (Multi-view Video Coding) v. MVD (Multi-view Video plus Depth)

The diagram of FIG. 5 is representative of a typical behavior (in terms of quality as perceived by the viewer v. bit-rate) for Multi-view Video Coding (MVC—possibly with view synthesis prediction) and Multi-view Video plus Depth coding (MVD—again possibly with view synthesis prediction).

Most of the multi-view video sequences currently available for coding experiments are not provided with their correspondent depth information. Extracting sufficiently accurate depth maps from the original colored ones is thus advantageous.

Data Compression, Transport, and Selective Data Decompression

The amount of data (color and depth) generated during the previous steps may need to be compressed if the target application requires transporting the content over a net. In that case, a multi-view coding standard like MVC/MVD could be resorted to.

This facilitates coping with various problems. For instance, when more then one view is encoded, multiple video streams may need to be synchronized and the amount of resulting data is advantageously compressed to be transmitted efficiently. Moreover, inter-view statistical redundancies can be exploited to save bitstream, e.g., by resorting to existing prediction structures, providing a trade-off between memory, coding delay, computational time and coding efficiency.

Multi-view video plus depth data can be converted into YUV 4:2:0 format for the color sequences, and YUV 4:0:0 format for the depth sequences, then compressed to a single bitstream to be transmitted over a net. Once received by the final host, the bitstream can be decompressed by the decoder. If a sub-set of the source views is enough for the target application, an efficient approach is to selectively extract a minimum sufficient set of frames/views.

Display

Display is often the last, but definitely not least, significant aspect in video content fruition. In a FVV/3DV context as described herein, the video display may be bi-dimensional if the sequence produced is just a FVV sequence, three-dimensional if it includes the 3D effect. In the 3D case, display is the most visible aspect of the whole chain in determining appreciation and success of 3D Television (3DTV) with the general public.

Techniques for 3D display play an ever-increasing role in a number of applications such as scientific visualization and measurement, medical imaging, tele-presence, gaming, as well as movies and television itself. Different 3D displays have been presented over the last few decades. Much development in 3D imaging and displays of the last years of the $20^{th}$ century has been encouraged by the invention of holography, and this has led to some significant advances in autostereoscopic and volumetric methods. The latest developments in virtual reality techniques have encouraged the computer and optics industry to produce better head-mounted displays and other 3D displays. Stereoscopic 3D displays provide different perspective views to the left and right eye. As in natural vision, the differences in perspective may be used to create a vivid and realistic sensation of depth in natural and computer-generated scenes.

Apart from video-communications (e.g., concert and sport events broadcasting, DVD movies, mobile contents), 3D displays have proven to be particularly useful in applications where immediate and accurate depth perception is particularly significant (e.g., remote control of vehicles and robotic arms in hazardous environments, handling and coordination of instruments in endoscopic surgery). Moreover, 3D displays are becoming increasingly useful for education (e.g., museums, simulator-based training, teaching), engineering (e.g., Computer Aided Design (CAD) and Manufacturing (CAM), virtual prototyping, architecture), and other scientific applications (e.g., displaying of complex protein molecules, structure-based drug design), both as individual stand-alone devices and as networked systems for tele-cooperation.

The 3D display may create the illusion of depth or distance by using a series of depth cues such as disparity, motion parallax, and ocular accommodation. Additional cues are also used for image recognition, while aspects such as image resolution, field of view, brightness, whether they are single or multi-user, viewing distance and cost may play an appreciable role.

Turning now back to FVV/3DV chain considered herein, the rendering stage and its performance influence the final quality of the generated views.

The rendering engine may synthesize the desired virtual frames/views with respect to the target application, for example:

for a pure Free Viewpoint Video effect: one frame for each position of the virtual camera moving inside the scene;

for a pure 3D Video effect: two adjacent (e.g., 6.5 centimeter apart) stereo frames (this procedure could even be used as a tool for converting a "2D content plus depth" into a 3D content, if used with a very effective occlusion-solving algorithm);

for a complete FVV plus 3DV effect: the rendering engine generates two (stereo) frames for each position of the virtual camera/viewpoint. During each phase of the rendering process, the source data transform continuously; these phases are described in detail in the following.

As already indicated, a Pinhole Camera Model (PCM) can be resorted to in the view synthesis process. PCM will be further detailed in the following, but as first step one may just consider that this model makes use of a so-called Projection Matrix P for each camera involved in the projection, i.e., the source camera and the target virtual camera.

Figure 6:
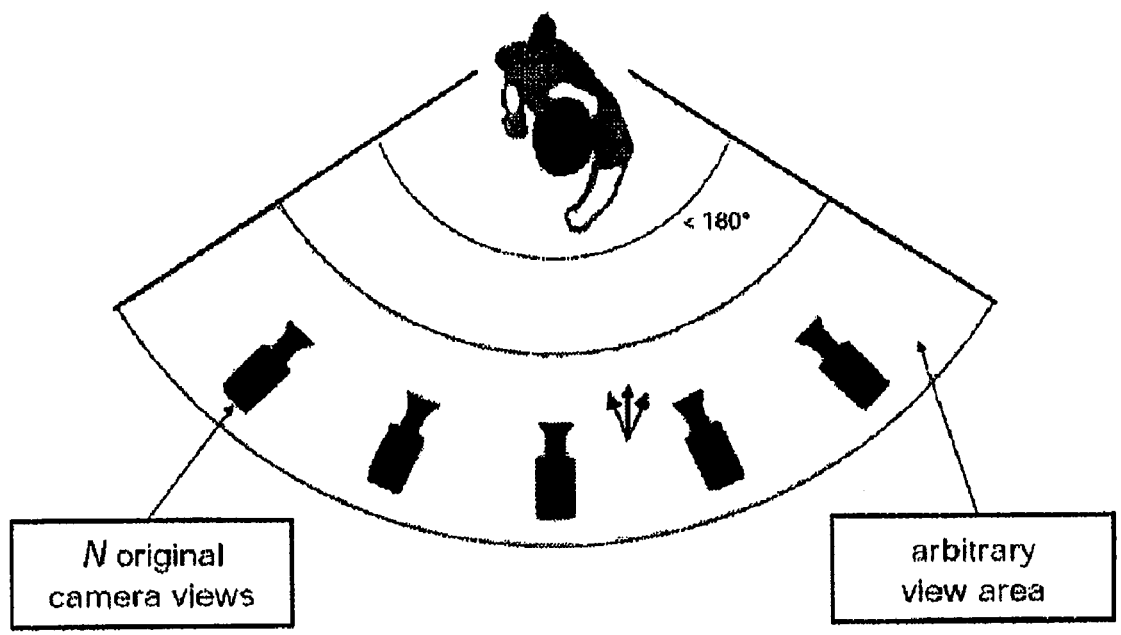
FIG. 6 is a schematic representation of a virtual camera.

A first issue to deal with in a FVV application, is finding the projection matrix of the virtual target view starting (i.e., performing the virtual camera step 102) from N original camera views located within an arbitrary view area as schematically represented in FIG. 6. This is because no real cameras have been placed in that specific viewpoint, so that no information has been recorded about its parameters.

An approach may be using a method derived from the theory of quaternion curves, named Spherical Linear Interpolation as described, e.g., in K. Shoemake, "Animating Rotation with Quaternion Curves", ACM SIGGRAPH, San Francisco, USA, July 1985. This method facilitates computing directly the projection matrix of any intermediate view on a linear path between the two original cameras.

Another possible method may be using a Neural Network to estimate these parameters or any other approach which may produce view parameters that are, for example:

congruent with those available real ones; and geometrically correct (e.g., rotation matrixes that are orthonormal).

As regards projection (i.e., step 104), geometry may be an important tool in a three-dimensional world. The source material available in an image-based FVV framework is however an image, not a geometrical model. Nonetheless, the information associated with each pixel in the image is two-fold: its position, and its color (or brightness, for a monochrome image); therefore, geometry can be used to project every pixel from a real camera viewpoint to a virtual camera viewpoint.

The Pinhole Camera Model (PCM) is used to determine the position of a specified point of a scene inside a frame recorded by a certain camera. This means computing the projection matrix P that allows finding the 2D pixel point m at frame coordinates (u,v) correspondent to the 3D point M located at three-dimensional coordinates (x,y,z) and vice versa:

$$\alpha m = PM$$

where $\alpha$ is a scaling factor.

In a three-dimensional framework, the position of each camera is described with respect to a single predefined reference system W(X,Y,Z), i.e., the "world", that can correspond to any of the real cameras' reference system.

Given a camera C, the procedure to derive the projection matrix P can be split in three steps.

A first step is transforming the 3D world point M to the camera's reference system C: this means finding the relationship between C and W, summarized by the two following elements:

t(C): the Translation Vector, describing the displacement of C with respect to W;

R(C): the Rotation Matrix, describing the orientation of C with respect to W.

Figure 7:
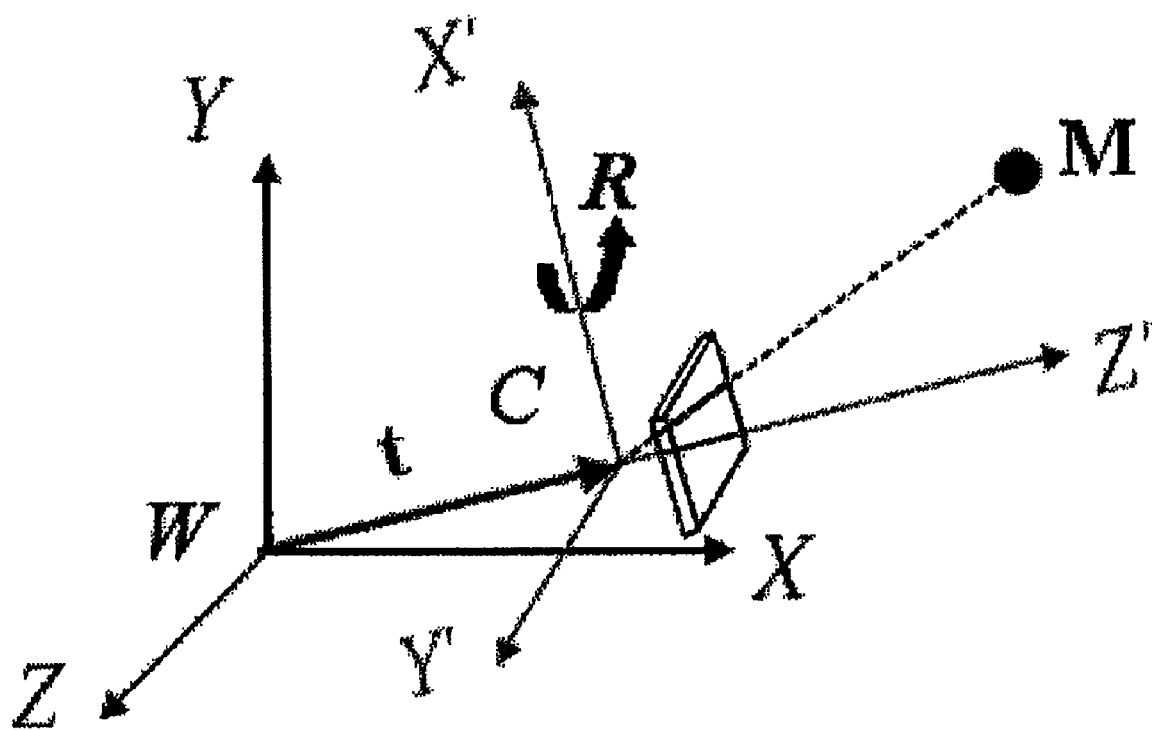
FIG. 7 is a diagram representative of the relationship between a camera and the world.

This concept is represented in FIG. 7.

Knowing t(C) and R(C), the 3D world point M can be expressed in homogeneous coordinates into the camera's reference system C(X',Y',Z') as M':

$$\begin{vmatrix} x' \\ y' \\ z' \\ 1 \end{vmatrix} = \begin{vmatrix} R^T & -t \\ 0^T & 1 \end{vmatrix} \begin{vmatrix} x \\ y \\ z \\ 1 \end{vmatrix}.$$

Figure 8:
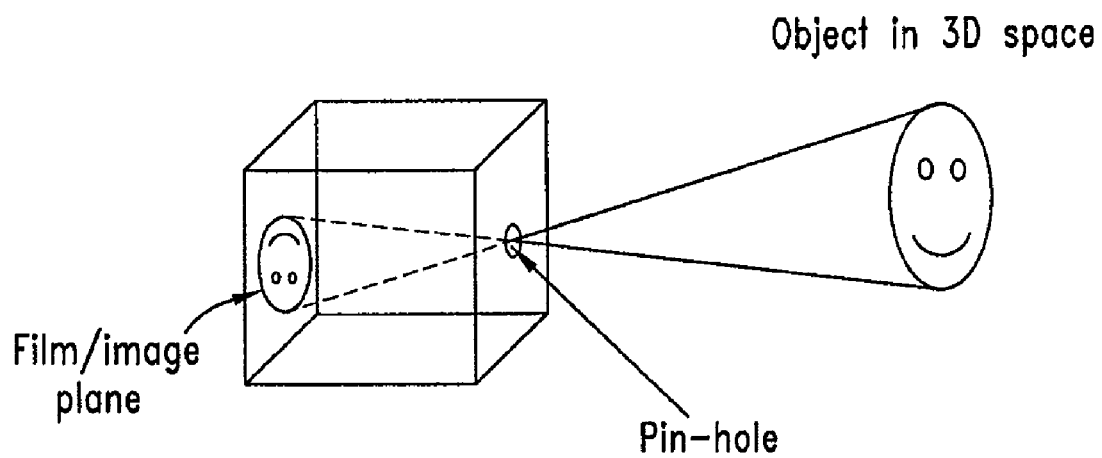
FIGS. 8 and 9 are illustrative of a Pinhole Camera Model (PCM).
Figure 9:
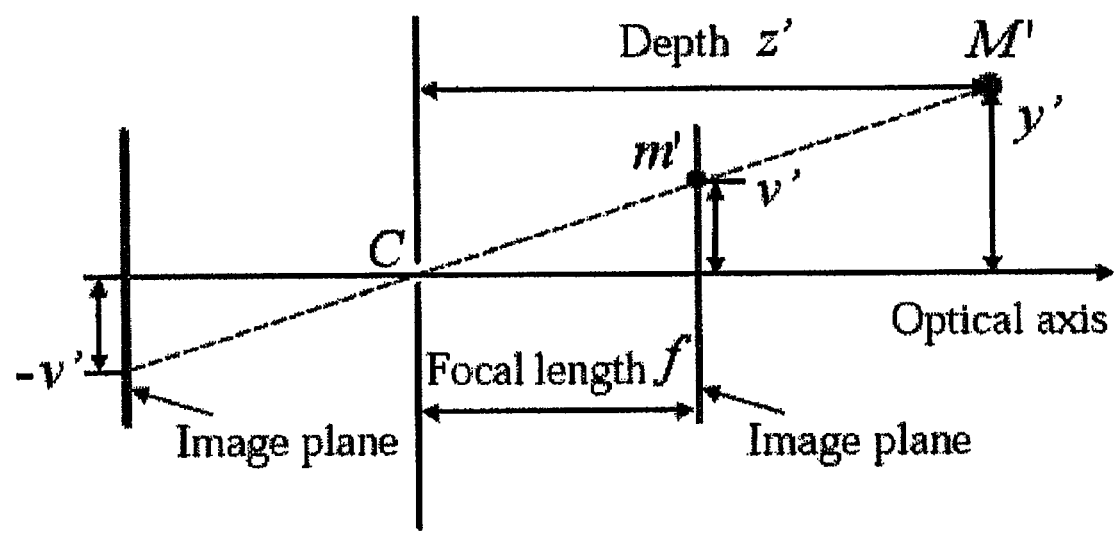

A second step is projecting the point onto the image plane of the camera. What happens in a real camera is represented by FIGS. 8 and 9.

First of all, some elements can be identified:
the optical center C (also known as camera projection center);
the principal plane (or focal plane), containing C;
the image plane, parallel to the principal plane and containing the projected image;
the focal length f, that corresponds to the distance from the image plane to the principal plane;
the optical axis, as the line from C perpendicular to the image plane.

Thus, the 3D point M' located at the camera reference system coordinates (x',y',z') maps to the 2D point m' at image plane coordinates (u',v'):

$$m' = \frac{f}{z'} M'.$$

Using homogeneous coordinates, this can be expressed as a linear transformation:

$$\begin{vmatrix} u' \\ v' \\ f \end{vmatrix} = \frac{1}{\lambda} \begin{vmatrix} 1 & 0 & 0 & 0 \\ 0 & 1 & 0 & 0 \\ 0 & 0 & 1 & 0 \end{vmatrix} \begin{vmatrix} x' \\ y' \\ z' \\ 1 \end{vmatrix}$$

where $\lambda$ is the ratio z'/f.

A third step is mapping the point into image coordinates. In expressing m' as coordinates of the recorded image, one takes into account the origin of the image reference system and the scaling factor of the camera. The calibration matrix K encodes the transformation from camera coordinates to pixel coordinates and depends on the so-called intrinsic parameters:

the (already mentioned) focal length f;
the principal point coordinates in pixels $(u_0, v_0)$, that is the point in which the optical axis intersects the image plane;
the pixel scaling factor $(k_x, k_y)$ along the two axis of the camera photosensor.

Using homogeneous coordinates, the point m' maps to the target pixel point m by the following relationship:

$$\begin{vmatrix} u \\ v \\ 1 \end{vmatrix} = \frac{1}{f} \begin{vmatrix} -f \cdot k_x & 0 & u_0 \\ 0 & -f \cdot k_y & v_0 \\ 0 & 0 & 1 \end{vmatrix} \begin{vmatrix} u' \\ v' \\ f \end{vmatrix}$$

where the leftmost matrix at the second member is the calibration matrix K.

For a more precise model of the camera, additional parameters could be considered, like for example the radial distortion: experiments performed by the applicants show however that this is in no way mandatory, even for high quality results.

The relationship of the 2D pixel point m at frame coordinates (u,v) correspondent to the 3D point M located at three-dimensional coordinates (x,y,z) may thus be expressed as:

$$\begin{vmatrix} u \\ v \\ 1 \end{vmatrix} = \frac{1}{z'} \begin{vmatrix} -f \cdot k_x & 0 & u_0 \\ 0 & -f \cdot k_y & v_0 \\ 0 & 0 & 1 \end{vmatrix} \begin{vmatrix} 1 & 0 & 0 & 0 \\ 0 & 1 & 0 & 0 \\ 0 & 0 & 1 & 0 \end{vmatrix} \begin{vmatrix} R^T & -t \\ 0^T & 1 \end{vmatrix} \begin{vmatrix} x \\ y \\ z \\ 1 \end{vmatrix}.$$

In the case of homogeneous coordinates, this can be re-written as:

$$z'm = K[R^T|-t]M.$$

The projection matrix P is given by:

$$P = K[R^T|-t].$$

Since the rotation matrix is orthonormal, $R^T = R^{-1}$.

To synthesize a novel view in a horizontal linear camera arrangement (presumably the most common case of FVV) at least one real view for each horizontal side (left and right) of the image is used. Increasing the number of views for each side will result in fewer occlusions after merging the contributions. The source images are projected into the target virtual viewpoint by applying PCM.

Since PCM is based on knowledge of the depth of each image pixel, a per-sample depth map (see below) is used for each source camera; from these, virtual intermediate views can be rendered from any position in between two adjacent cameras, thus providing advanced FVV functionality, as exemplified, e.g., in Joint Video Team of ISO/IEC MPEG & ITU-T VCEG, "MVC: Experiments on Coding of Multi-view Video plus Depth", JVT-X064, Geneva, Swiss, June 2007 (already cited).

The quality of the generated views may decrease with the distance from the real cameras, due to occlusions and other problems.

More in detail, being CT the target camera to be generated and $C_S$ the generic source camera, the following elements are used for view synthesis:

$K(C_S), R(C_S), t(C_S)$: intrinsic and extrinsic parameters of the source camera;

K($C_T$),R($C_T$),t($C_T$) intrinsic and extrinsic parameters of the target camera;

I($C_S$,u,v): intensity color of the source camera;

D($C_S$,u,v): depth map of the source camera.

I and D are congruent in time.

The procedure to perform the synthesis of one frame of the target view is summarized below.

For each source view $C_S$, for each pixel (u,v) of the source image:

i) Project the pixel location into the world reference system by using the inverse of the source camera's projection matrix:

$$M_W = P_S^{-1} z'_S m_S$$

or equally:

$$\begin{vmatrix} x \\ y \\ z \end{vmatrix}_W = R(C_S) \cdot K^{-1}(C_S) \cdot \left( \begin{vmatrix} u \\ v \\ 1 \end{vmatrix}_S \cdot D(C_S, u_S, v_S) + K(C_S) \cdot t(C_S) \right)$$

where $z'_S = D(C_S, u_S, v_S)$.

ii) Project the world coordinates into the coordinate system of the target camera by using the target camera's projection matrix:

$$z'_T m_T = P_T M_W$$

or equally:

$$\begin{vmatrix} u' \\ v' \\ z' \end{vmatrix}_T = K(C_T) \cdot R^{-1}(C_T) \cdot \begin{vmatrix} x \\ y \\ z \end{vmatrix}_W - K(C_T) \cdot t(C_T).$$

iii) Convert to homogeneous form to obtain the pixel location in the target frame:

$$\begin{vmatrix} u \\ v \\ 1 \end{vmatrix}_T = \begin{vmatrix} u' \\ v' \\ z' \end{vmatrix}_T \cdot \frac{1}{z'_T}.$$

iv) Assign the source intensity to the target pixel location in the synthesized frame:

$$I(C_T, u_T, v_T) = I(C_S, u_S, v_S).$$

The result is one new frame for each source view, corresponding to the projection of the relative source frame into the target viewpoint.

The effect of projection (step 104) can be best understood by referring to an example to clarify the effect of the projection.

One may assume to have a semicircular camera arrangement made up of eight views as in the "Breakdancers" sequence (1024×768@15 fps, 100 frames) considered in C. L. Zitnick et al. (repeatedly cited), with cameras from $C_0$ (rightmost) to $C_7$ (leftmost).

In order to evaluate each stage of the rendering process, one may take as target viewpoint, e.g., the camera $C_3$ and generate the first frame of the sequence by using, for example, one camera for each side, so $C_2$ and $C_4$. When considering the result of the projection of these two source frames (left: $C_4$, right: $C_2$) to the target viewpoint ($C_3$) one may see that each projection leaves unfilled many areas of frames, due to correspondent occluded areas in the source frames. For example, since $C_4$ is placed on the left of the target view, projecting the source frame makes content move to the left, resulting in unfilled areas on the right of each moved object. Vice versa, $C_2$ is placed on the right of the target view, so that projecting the source frame makes the content move to the right, resulting in unfilled areas on the left of each moved object.

Blending (step 106) is the consequence of the projection, and aims at merging the contributions of the source views in a single resulting frame. In an embodiment, the unfilled areas in the left projected views are filled in the right projected views, and vice versa. Hence, the focus is on how to merge the areas that result filled in more than one projected image.

Uniform blending is the simplest solution: the projected views are uniformly weighed. This solution may not be fully satisfactory, especially when the number of source views is big.

Non-uniform blending (e.g., weighing the views with respect to their distance to the target view) may be more satisfactory than uniform blending.

Example embodiments of the arrangement described herein implement one of three strategies, namely:

inverse of distance: projected views are weighed inversely to their distance to the target view;

inverse of squared distance: projected views are weighed inversely to their squared distance to the target view;

binary inverse of distance: projected views are weighed inversely to their distance to the target view by using binary coefficients.

The first and the second strategy perform almost in the same way, while the third has been found to render the blending phase faster. In fact, the blending step/stage 106 may turn out to be cumbersome from the computational viewpoint, if for each pixel all the contributions are averaged by means of a floating-point division (the operation is trebled if one considers that a pixel is made up of luminance and two components of chrominance).

In an embodiment, binary shifting is used to reduce to fewer clock cycles the division operation involved in the average computation. This is feasible if the divisor is a power of two, and for that purpose the weighing coefficients for the views are chosen in order to make their sum (and so the divisor) equal to a power of two. For a number of five views per side, an exemplary weighing is represented in Table 1 below, where negative values are referred to left views, and positive values to right views.

TABLE 1

| Binary weighting |||||||||||
|---|---|---|---|---|---|---|---|---|---|---|
| | View |||||||||||
| | −5 | −4 | −3 | −2 | −1 | 1 | 2 | 3 | 4 | 5 |
| Weight | 1 | 2 | 4 | 8 | 17 | 17 | 8 | 4 | 2 | 1 |

Note that pure binary weighting would result in a non-binary sum of the coefficients (i.e., 2*(1+2+4+8+16)=62). To overcome this problem, the two closer views will have "1" added to their weights, making the sum be a binary value (i.e., "64"), so that a binary shifting can be used to compute the division (i.e., the division by "64" corresponds to the binary shifting of "6" bits towards the LSB, that is the "$\log_2(64)$").

Assuming that in most instances the number of source views is even, and that the most of pixel positions will be filled in every projected frame, the result is that, in most averaging operations, it will be possible to use the binary shifting to compute the division; in all the remaining cases, the floating division will be used. The benefit of this approach increases with the number of source views (even in number).

In an embodiment, layered blending can be used. With this approach the projected views equally close to the target view are used to fill occlusions, layer-by-layer. Not all the pixels of the projected frames are used, but only those which are needed for filling the occlusions. In other words, the cameras are grouped in "layers" before projection with reference to their distance of the target camera, and their contributions are used to fill occlusions layer-by-layer.

Again, this approach can be best understood by way of another example referred to the "Breakdancers" sequence (1024×768@15 fps, 100 frames) considered in the foregoing.

If $C_3$ is taken as the target camera, one has the following layers:

$L_1 = \{C_2, C_4\}$;
$L_2 = \{C_1, C_5\}$;
$L_3 = \{C_0, C_6\}$;
$L_4 = \{C_7\}$;

After projection, the views belonging to the first layer ($L_1$) are merged; in order to fill the remaining occluded areas, the pixels of the frames belonging to the next layer are used, and so on up to the last available layer. For each step, the frames involved are uniformly blended, and only the views belonging to the first layer contribute with all their pixels; the others views participate just with those pixels that are needed to fill the occluded areas remaining after the previous iteration of the algorithm.

The performance levels of the five methods discussed in the foregoing are slightly different, and are summarized in the table below. The results in the table refer to a test consisting in synthesizing the first frame of the sequence recorded from the camera $C_3$, varying the number of source views.

TABLE 2

Blending performance

| Blending method | source views | PSNR [dB] | | |
|---|---|---|---|---|
| | | Y | U | V |
| Uniform | 2 | 30.87 | 28.17 | 27.46 |
| | 4 | 32.99 | 33.22 | 32.49 |
| | 6 | 32.95 | 33.89 | 33.12 |
| Inverse of distance | 2 | 30.87 | 28.17 | 27.46 |
| | 4 | 33.04 | 33.21 | 32.48 |
| | 6 | 33.21 | 33.88 | 33.15 |
| Inverse of squared distance | 2 | 30.87 | 28.17 | 27.46 |
| | 4 | 32.95 | 33.19 | 32.47 |
| | 6 | 33.18 | 33.84 | 33.14 |
| Binary inverse of distance | 2 | 30.87 | 28.17 | 27.46 |
| | 4 | 33.00 | 33.20 | 32.48 |
| | 6 | 33.24 | 33.86 | 33.14 |
| Layered | 2 | 30.87 | 28.17 | 27.46 |
| | 4 | 32.68 | 33.10 | 32.39 |
| | 6 | 32.88 | 33.69 | 33.03 |

The performance levels in Table 2 are in terms of PSNR values referred to the original frame captured from $C_3$. After this stage not all the occlusions have probably been filled, but they are the same for all the blending methods, so that the PSNR values are consistent.

Table 2 shows that the result of blending one view for each side (Source views=2) is the same for each blending method, because the weight is unary in all the cases. Those techniques that use a weighting related to the distance perform better than the "Uniform" and the "Layered" ones. In particular, the "Inverse of distance" appears to be the best when using four views as source, while the "Binary inverse of distance" the best (just luminance) when using six source views.

Using more than one view per side affects directly the percentage of filled frame after the blending, as summarized in the table below.

TABLE 3

Percentage of filled frame with respect to the number of source views

| Source views | Unfilled pixels | Filled frame [%] |
|---|---|---|
| 2 | 8412 | 98.93 |
| 4 | 2577 | 99.67 |
| 6 | 2048 | 99.74 |
| 7 | 2002 | 99.75 |

In certain embodiments of the arrangement described herein, two techniques can be resorted to in order to fill occlusions (occlusion solving step 110) remaining after blending, namely:

pixel background filling;
area background filling.

Both techniques exploit the same concept, i.e., filling the gap with the background. Identifying the correct background ensures that the occlusion will not be filled with a wrong color.

Pixel background filling searches each pixel of the occluded area for the farthest (in depth) neighboring pixel, and fills the current occluded pixel with the same color of the identified one. For instance one may consider an exemplary case where the algorithm, when performing a raster scan of an image, e.g., from the top-left corner, to the bottom-right corner, encounters a pixel belonging to an occlusion. The algorithm will start scanning the eight neighboring pixels searching for the farthest. In order to allow this step, during the projection phase a frame for each projected view is recorded, containing the depth values of the projected pixels, i.e., the $z'_T$ values of the exemplary formula for the depth considered in the foregoing. Searching of the farthest pixel will take place in a small area around the current pixel, so that the algorithm will propagate the colors at the other pixel of the occlusion, which is likely to result in a striped area. Moreover, the result will be influenced on the raster scanning direction, so that the method might even fail to find the true background.

Certain embodiments of the arrangement described herein will thus adopt area background filling. This technique involves searching the farthest pixel (i.e., the background) among the pixels located at the gap area's contour. When found, the farthest pixel's color is assigned to all the unfilled pixels. The filled area is "painted" uniformly, looking more similar to the true background; while notionally un-realistic, this effect is well masked by final filtering. In terms of PSNR, there are no substantial differences between the two methods (see Table 4 below) insofar as the unfilled areas cover a small part of the image. However a difference in quality may be perceived in certain cases by looking at the images.

TABLE 4

Filling performance

| Filling method | Source views | PSNR [dB] | | |
|---|---|---|---|---|
| | | Y | U | V |
| 1 | 2 | 33.44 | 40.88 | 42.09 |
| 2 | 2 | 33.41 | 40.89 | 42.11 |

An artifact possibly resulting in the frame at this point of processing is unrealistic borders around a moving object.

To mask this effect, a matting filter (boundary matting step 110) is applied on the border pixels. An undesired border results on the background colored pixels facing to the unfilled areas.

These pixels can be identified by means of an algorithm to find the boundaries of the objects by searching the source depth frame (e.g., of all the involved views) for discontinuities in the depth values. When a discontinuity greater than a specified threshold is found, then the pixel having the higher depth value (i.e., the closer, because of the conversion derived in the foregoing) becomes part of a so-called "foreground boundary". Vice versa the pixel having the lower depth (i.e., the farthest) becomes part of a so-called "background boundary".

Thus, during the projection stage, a trace is kept of the final position (in the target viewpoint) of these boundaries. For instance, by referring again to the "Breakdancers" sequence considered in the foregoing, if $C_2$ is placed at the right of the target camera, the objects move to the right while projecting the frame, leaving unfilled areas on the left of the objects themselves. Hence, not all the background pixels existing before the projection are visible after the projection, since some of them are covered by the moved object. Both the boundaries move, but the background boundary moves less than the foreground boundary since it is (by definition) farther from the camera. By merging all the boundary contributions it is possible to find the target background and foreground boundaries.

At this point, it is possible to apply the matting pixel just on the background of the target frame, ie., where the artifacts appear.

In an embodiment, the filter is a parametric n-tap FIR filter with a threshold on the vertical and horizontal directions.

While the filter is effective in reducing the annoying artifacts around objects, traces of the borders may be still noticeable.

This may happen because this border may not be exactly as thick as the background boundary (one pixel of thickness), it is actually about two or three pixels of thickness (or more in some unfortunate cases), so that it may not be completely masked with a simple filter.

A final step of the rendering chain described herein is filtering (step 112), that is helpful in giving to the synthesized frame the impression of being more realistic.

Filtering aims at masking all the remaining artifacts and at reducing the pixelation effect due to projection.

Possible embodiments of a filter include:

an averaging filter;

a Gaussian filter.

Both filters are parametric in size, while the second is even in the standard deviation. To make a comparison, these filters have been applied to the output of the rendering chain described so far, with all the best tools enabled, while rendering the first frame of the camera $C_3$.

The first method (size 3) reaches a higher score than the second (size 3, sigma 0.7) as shown in Table 5, and the highest quality in luminance is obtained when using two views per side.

TABLE 5

| Filtering performance | | | | |
|---|---|---|---|---|
| Filtering method | Source views | PSNR [dB] | | |
| | | Y | U | V |
| None | 2 | 33.43 | 40.89 | 42.13 |
| | 4 | 33.98 | 41.81 | 43.22 |
| | 6 | 33.92 | 42.13 | 43.34 |
| 1 | 2 | 33.65 | 41.69 | 43.08 |
| | 4 | 34.02 | 42.53 | 44.04 |
| | 6 | 33.85 | 42.68 | 44.12 |
| 2 | 2 | 33.34 | 41.85 | 43.31 |
| | 4 | 33.80 | 42.68 | 44.19 |
| | 6 | 33.66 | 42.73 | 44.26 |

A complete data flow as illustrated in FIG. 1, analyses the rendering of a target frame starting from two source views, and underlines the input/output data for each block of the chain.

The notation used includes $I(C_N)$: color frame, $D(C_N)$: depth frame. Moreover, $B_{BG}(C_N)$ is the background boundary, and all the subscripts refer to the proper stage (e.g., "P" refers to "Projection."). The left side FIG. 1 shows the memory allocation in terms of frame buffers per source camera (FB/SC), where a frame buffer is intended to be a one-layer matrix (i.e., just luminance).

Certain embodiments of the arrangement described herein may include:

a method for filling holes due to rounding;

a smart projection method to be used alternatively to boundary matting in combating the artifacts in the resulting frames;

a method for improving the final quality of the rendered frame.

Filling holes due to rounding may be helpful in the presence of small unfilled areas, often the size of just one or two pixels. These gaps may be due to the integer-rounding operation that assigns to the projected pixels a position (u,v) within the frame. When the resulting location is at least two unities greater than the previous one (located on the same row of the frame), a one-pixel-sized area remains unfilled.

In most instances, the blending phase 106 succeeds in filling the most of these gaps, since that the same pixel position is unlikely to remain unfilled in all the projected frames.

In order to further reduce this possibility, with certain thresholds of hole-size and pixel-color, it is possible to proceed by assigning to the pixel or pixels in the hole the average value of the pixels located at the two extremities of the hole. When adopting this approach, in the same conditions used in Table 5, with two source views per side, the PSNR changes:

from (34.02, 42.53, 44.04) to (34.04, 42.53, 43.99) [dB] for the Average filter;

from (33.80, 42.68, 44.19) to (33.84, 42.69, 44.16) [dB] for the Gaussian filter.

Even if the increase in PSNR is not so high, this approach is helpful in solving an undesired artifact, still related to the non-perfect depth maps: while projecting a frame, if an object has a such a small difference in depth with respect to the background depth that it cannot be identified as a boundary by the algorithm responsible for finding boundaries in the matting stage, the resulting effect can be masked by setting the color threshold. This method masks the undesired artifact in that it avoids any small gaps being wrongly filled with the background color during the blending stage.

While the matting filter of step 110 reduces the artifacts around the borders of moving objects, these artifacts may still adversely affect the quality of the final frame. These artifacts are due to non-perfect depth maps related to the color frames: if the depth-area associated to an object is slightly smaller than the object itself in the color frame, the extreme border belonging to the object in the color frame will have the depth of the background, and not the depth of the object, as it should have.

When projecting the frame in the first phase, the color pixels that have the correct depth are projected in the correct position, while those belonging to this border are projected far from the object, because they have the depth of the background in the source frame.

An embodiment of the arrangement described herein thus does not project those pixels in the source frames that have wrong depth values, so that these are not projected far from the object making the borders appear.

The thickness of the border around objects that have wrong depth values is unpredictable, as it depends on the reliability of the (stereo matching) algorithm used to extract the depth from the sequence. However, the thickness of the border belonging to the source frame that the rendering engine has not to project ("skip boundary") can be made parametric.

For instance the thickness of the skip boundary can be set to "3" pixels.

The foreground boundary is the same as before, and the background boundary moves far from it to leave place to the new skip boundary. The effect of not projecting some source pixels is that there is less information in the projected frame, i.e., bigger unfilled areas. In any case, these unfilled gaps are partly filled during the blending stage, and the remaining occluded areas, if the thickness of the skip boundary is not excessive, can be managed by the filling algorithm. This method makes it unnecessary to apply a matting filter along the background boundary.

In terms of PSNR, Table 6 below (where the results refer to the synthesis of the frame "89" of the camera $C_3$ of the "Breakdancers" example repeatedly considered in the foregoing) shows that the matting filter reaches a higher score than the approach considered here, but the latter was found to produce a more realistic frame.

TABLE 6

Matting performance

| Matting method | Source views | PSNR [dB] | | |
|---|---|---|---|---|
| | | Y | U | V |
| None | 2 | 32.87 | 41.19 | 42.37 |
| Matting filter | 2 | 32.93 | 41.20 | 42.39 |
| Skip boundary (thickness equal to "2"). | 2 | 32.93 | 41.18 | 42.37 |

The final quality of the rendered frame can be further improved by resorting to technique derived from the smart projection algorithm: since when watching a FVV sequence it is easy to see artifacts close to the borders of the objects that are moving while the camera is moving as well (for example, a pixelation effect due to projection), the color borders of the moving objects in the source frames may be applied (e.g., copied) onto the target frame in order to maintain a more realistic effect.

The aim is thus to find the foreground boundary (i.e., the extreme border of any moving object) and the so-called "extended boundary" (i.e., practically the same as the skip boundary, but intentionally called in another way since they can be set at different thickness values) with the algorithm already mentioned in the foregoing. After merging all the projected frames, the extended boundary color is copied onto the target frame. In an embodiment, this is not copied properly, but averaged with the existing color.

At least three kind of averaging are feasible:
uniform;
inverse of distance;
inverse of squared distance.

Since the extended boundary thickness can be set to the desired value, "distance" denotes the distance of the extended boundary's pixel to the foreground boundary. Good results can be obtained with thickness size of "2" or "3" pixels. Uniform blending usually yields a less preferable result, and the other two blending processes work more or less the same way, as shown in Table 7. There, the results again refer to the synthesis of the frame "89" of the camera $C_3$ of the "Breakdancers" example.

TABLE 7

Extended boundary performance

| Averaging method | Source views | PSNR [dB] | | |
|---|---|---|---|---|
| | | Y | U | V |
| None | 2 | 33.22 | 41.22 | 42.33 |
| 1 | 2 | 31.80 | 40.63 | 41.91 |
| 2 | 2 | 33.23 | 41.21 | 42.34 |
| 3 | 2 | 33.29 | 41.23 | 42.34 |

The last step is again the final filtering step 112.

The effectiveness of these last three optional improvement steps on the final quality has been tested with the following experiments:

Experiment 1:

| | |
|---|---|
| 1.a. | Synthesis of the first frame of the camera C3; |
| 1.b. | Two source views per side; |
| 1.c. | Default projection; |
| 1.d. | "Inverse of distance" blending; |
| 1.e. | "Area background" filling; |
| 1.f. | "Matting boundary" filtering with size equal to "3" pixels and threshold equal to "20"; |
| 1.g. | "Average" filtering with size equal to "3" pixels. |

Experiment 2:

| | |
|---|---|
| 2.a. | Synthesis of the first frame of the camera C3; |
| 2.b. | Two source views per side; |
| 2.c. | Smart projection with "Skip boundary" size equal to "2" pixels; |
| 2.d. | "Filling holes due to rounding" method; |
| 2.e. | "Inverse of distance" blending; |
| 2.f. | "Area background" filling; |
| 2.g. | "Extended boundary" overlay of size "2" pixels and "Inverse of squared distance" averaging; |
| 2.h. | "Average" filtering with size equal to "3" pixels. |

These experiments differ in that the "Default projection" (1.c) has been substituted with the "Smart projection" (2.c) together with the "Filling holes due to rounding" (2.d), and the "Matting boundary" (1.f) with the "Extended boundary" (2.g).

The PSNR results of these experiments are reported in Table 8 below.

TABLE 8

Results of experiments

| Experiment | Source views | PSNR [dB] | | |
|---|---|---|---|---|
| | | Y | U | V |
| 1 | 2 | 34.02 | 42.53 | 44.04 |
| 2 | 2 | 34.05 | 42.60 | 44.01 |

The increase in PSNR values is not very high, but the perceived quality by looking at the generated images is unquestionably improved.

In terms of software implementation, the arrangement described lends itself to at least two versions, namely:
a "Fast Projection" version;
a "Memory Reduction" version.

The Fast Projection version adopts a concept of projecting the source pixels based on the following idea: instead of projecting the frame pixel-by-pixel, if "n" consecutive pixels (placed on the same row) are found to have the same depth value, only the projection of the first and the last pixel is computed, and if the final positions of these pixels have the same distance they had in the source frame, then all the inner pixels in the source frame are copied (instead of projected) to the target frame between the two projected pixels. If not, the fast projection is tried for a halved sequence length of the same consecutive pixels; the algorithm continues halving the sequence up to the minimum length (e.g., three pixels, which corresponds, in case of success, to save one pixel projection). The same principle holds if projection is performed done by columns (instead of by rows), by searching for consecutive pixels placed on the same column. The algorithm takes even into account the holes due to rounding.

Table 9 shows the results in the synthesis of the whole sequence of camera C3 (100 frames).

TABLE 9

Fast Projection performances

| Source Views | PSNR [dB] | | | Total Pixels | Skipped Pixels | Skipped Pixels [%] | Avg. Time | Time Gain [%] |
|---|---|---|---|---|---|---|---|---|
| | Y | U | V | | | | | |
| 2 | 33.16 | 41.98 | 43.28 | 1572864 | 969498 | 61.64 | 0.74 | 32.54 |
| 4 | 33.53 | 42.78 | 44.30 | 3145728 | 1828122 | 58.11 | 1.62 | 21.21 |
| 6 | 33.51 | 42.96 | 44.41 | 4718592 | 2599730 | 55.10 | 2.44 | 16.95 |

This technique succeeds in saving up to 33% of the total computational time (of the whole rendering chain) for two source views and 17% for six source views. In terms of skipped pixels (i.e., pixels for which the projection is not done) this corresponds to avoid the projection of up to 62% of the total pixels for two source views.

The "Memory reduction" version relates to a way to save memory. It involves keeping trace of the "world" depth values in an integer format instead of in the floating-point format.

To measure the effectiveness of the method, the same "Experiment 2" described previously was repeated for both the standard and the improved versions: this is the heaviest configuration from the memory occupation point of view, because all the best tools are enabled. This method may be less precise than the standard one, but it allows saving about 30% memory regardless of the number of source views.

TABLE 10

Memory Reduction performance

| Source views | PSNR [dB] | | | Memory [MB] | Time [s] |
|---|---|---|---|---|---|
| | Y | U | V | | |
| Default Version | | | | | |
| 2 | 33.64 | 41.71 | 43.04 | 24 | 1.10 |
| 4 | 34.05 | 42.60 | 44.01 | 34 | 2.06 |
| 6 | 33.88 | 42.76 | 44.10 | 47 | 2.94 |
| Memory Reduction Version | | | | | |
| 2 | 33.63 | 41.71 | 43.03 | 17 | 1.05 |
| 4 | 34.04 | 42.61 | 44.02 | 25 | 1.95 |
| 6 | 33.87 | 42.76 | 44.11 | 33 | 2.69 |

| Source views | Gain [%] | |
|---|---|---|
| | Memory | Time |
| 2 | 29.17 | 4.19 |
| 4 | 28.57 | 5.20 |
| 6 | 29.79 | 8.61 |

Table 10 shows that, by changing the format, even a little extra time saving occurs.

In an embodiment, the device described herein runs an ANSI-C compliant software, developed on a Linux platform with gcc version 4 installed. Exemplary of the activities that may be enabled are:
Fixed Viewpoint synthesis, namely generation of a novel frame or a sequence (whole or a part of it) located at a fixed viewpoint;
Free Viewpoint synthesis, namely generation of a real free viewpoint sequence by specifying the camera path within the 3D space;
Projection testing, that means to perform the projection of a point in order to know where a specified 2D point (u,v) having a certain depth (w) in the source frame will be projected in the target frame.

In an embodiment, software resources operate on two input files:
a configuration file: this contains the parameters used in the rendering process, among which a command-string specifying the path of the virtual camera;
a calibration file: this contains the parameters related to the cameras.

The configuration file may permit to specify the output to be generated beyond the target sequence: target depth sequence, target boundary sequence, partial sequences, and partial boundary sequences (before projection and after projection).

An embodiment of the arrangement described herein is thus a rendering chain in a Free Viewpoint Video/3D Video framework implementing a whole process of rendering for use, e.g., in a FTV (Free Viewpoint Television) context. This arrangement lends itself to be implemented in terms of automatic computation of the virtual camera projection matrix allowing free viewpoint navigation with 3D support, which is the generation of couples of virtual views located at the human being eyes distance. It also may be interfaced with the MVC (Multi-view Video Coding, MPEG 4—Part 10) encoder and decoder to support depth data and novel view rendering (with or without including a segmentation algorithm to extract depth data from stereo/multi-view sequences).

Besides, the software may be interfaced with a FVV player to let the user interactively move the target viewpoint (e.g., by the mouse), or play sequences generated off-line.

Without prejudice to the underlying principles of the description of embodiments, the details and the embodiments may vary, even appreciably, with respect to what has been described by way of example only.

As used herein, reference to a computer program product is intended to be equivalent to reference to a computer-readable medium containing instructions for controlling a computer system to coordinate the performance of a method, for example, of an embodiment. Reference to a computer, computer system or at least one computer include the possibility of implementing an embodiment in a distributed/modular fashion.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
executing a free viewpoint video synthesis process of video frames starting from source frames belonging to source viewpoints of a scene acquired using a multi-viewpoint camera system, by,
defining at least one target virtual viewpoint for the synthesis and computing a corresponding projection matrix for the target virtual viewpoint;
computing a corresponding projection matrix for each source viewpoint;
projecting pixels of the source frames from the source viewpoints to the target virtual viewpoint as respective contributions to a resulting video frame, wherein the projecting uses the projection matrixes corresponding to the source viewpoints and the target virtual viewpoint; and
merging the contributions to the resulting video frame, wherein the contributions include holes due to integer rounding in projecting pixels from the source frames, the method including filling the holes by assigning to a pixel or pixels in a hole an average value of pixels located at two extremities of the hole.

2. The method of claim 1, further comprising computing the projection matrix corresponding to the target virtual viewpoint each time the target virtual viewpoint changes during a video sequence.

3. The method of claim 1, further comprising extracting depth information from the source frames and projecting pixels from the source frames to the target virtual viewpoint by using the depth information.

4. The method of claim 3 wherein the extracting depth information from the source frames comprises using a segmentation algorithm of stereo views of the source frames.

5. The method of claim 1, including projecting pixels from the source frames to the target virtual viewpoint by using a Pinhole Camera Model (PCM).

6. The method of claim 1, further comprising filling occlusions and combating artifacts in the resulting video frame.

7. The method of claim 6, further comprising a filtering operation to mask remaining artifacts and reduce pixelation effects due to the projecting in the resulting video frame.

8. The method of claim 7 wherein the filtering operation includes one of:
an averaging filtering; and
a Gaussian filtering.

9. The method of claim 7 wherein the filtering operation includes parametric filtering.

10. The method of claim 7 wherein the filtering operation includes a Gaussian filtering parametric in size and standard deviation.

11. The method of claim 6 wherein the filling the occlusions is selected out of the group consisting of:
pixel background filling, including identifying for each current pixel in an occluded area a neighboring pixel farthest in depth and filling the current pixel with a same color of the neighboring pixel thus identified; and
area background filling, including identifying a pixel farthest in depth among the pixels in an occluded area and filling the pixels in an occluded area with a color of the pixel farthest in depth among them.

12. The method of claim 6, including matting boundaries in combating the artifacts in the resulting video frame.

13. The method of claim 12 wherein the matting the boundaries includes:
searching discontinuities in depth values in the source frames, the discontinuities being between a pixel having a higher depth value and included in a foreground boundary, and a pixel having a lower depth value and included in a background boundary;
merging the contributions of the pixels having lower depth values to define background boundaries in the frames; and
applying matting on the background boundaries.

14. The method of claim 12 wherein the matting the boundaries includes applying a parametric filter to reduce artifacts around objects in the source frames.

15. The method of claim 6 wherein the combating artifacts in the resulting video frame includes selectively omitting projecting for pixels in borders around objects in the source frames.

16. The method of claim 15, including making parametric a thickness of the borders for which projecting pixels is omitted.

17. The method of claim 1 wherein the merging the contributions to the resulting video frame comprises blending the contributions with relative weights with respect to the target virtual viewpoint.

18. The method of claim 17 wherein the blending is selected out of a group consisting of:
uniform blending, wherein the contributions are uniformly weighed;
non-uniform blending, wherein the contributions are weighed as a function of the distance of the corresponding source viewpoints to the target virtual viewpoint; and
layered blending, wherein those of the contributions equally close to the target virtual viewpoint are used to fill occlusions in a layer-by-layer fashion.

19. The method of claim 17 wherein the blending comprises non-uniform blending which includes one of:
weighing the contributions inversely of a respective distance to the target virtual viewpoint;
weighing the contributions inversely of a respective squared distance to the target virtual viewpoint; and
weighing the contributions inversely of the respective distance to the target virtual viewpoint by using binary coefficients.

20. The method of claim 19, further comprising modifying the binary coefficients and weighing the contributions by binary shifting.

21. The method of claim 1 including filling the holes after merging the contributions to the resulting video frame.

22. The method of claim 1, including locating color borders of moving objects in the source frames and applying the color borders onto the resulting video frame.

23. The method of claim 22, including making parametric a thickness of the borders applied onto the resulting video frame.

24. The method of claim 22 wherein applying the color borders includes one of:
copying the color borders onto the resulting video frame; and
averaging the color borders with an existing color in the resulting video frame.

25. The method of claim 1, including extracting depth information from the source frames and storing the depth information in integer format.

26. The method of claim 1, further comprising displaying the resulting video frame.

27. A method, comprising:
executing a free viewpoint video synthesis process of video frames starting from source frames belonging to source viewpoints of a scene acquired using a multi-viewpoint camera system, by,
defining at least one target virtual viewpoint for the synthesis and computing a corresponding projection matrix for the target virtual viewpoint;
computing a corresponding projection matrix for each source viewpoint;
projecting pixels of the source frames from the source viewpoints to the target virtual viewpoint as respective contributions to a resulting video frame, wherein the projecting uses the projection matrixes corresponding to the source viewpoints and the target virtual viewpoint; and
merging the contributions to the resulting video frame, wherein projecting pixels from the source frames to the target virtual viewpoint includes, in a presence of a sequence of consecutive pixels in a same row or column of a source frame having a same depth value:
computing a projection of a first and last pixel in the sequence; and
when the consecutive pixels, once projected, have a same distance as in the source frame, copying all the other pixels in the sequence to the target virtual viewpoint between the two projected pixels.

28. The method of claim 27, including,
when the consecutive pixels, once projected, do not have the same distance, repeating the computing for a new sequence of consecutive pixels of a length half a length of the sequence; and
when the consecutive pixels of the new sequence, once projected, have a same distance as in the source frame, copying all the other pixels in the new sequence to the target virtual viewpoint between the two projected pixels of the new sequence.

29. A method of executing a free viewpoint video synthesis process of video frames starting from source frames belonging to source viewpoints of a scene acquired using a multi-viewpoint camera system, the method comprising:
defining at least one target virtual viewpoint for the synthesis and computing a corresponding projection matrix for the target virtual viewpoint;
computing a corresponding projection matrix for each source viewpoint;
projecting pixels of the source frames from the source viewpoints to the target virtual viewpoint as respective contributions to a resulting video frame using projection matrixes corresponding to the source viewpoints and the target virtual viewpoint;
merging the contributions to the resulting video frame, with possible occlusions and artifacts deriving from the projecting and merging;
filling the occlusions and combating the artifacts in the resulting video frame; and
executing the free viewpoint synthesizing process of video frames twice for two related target virtual viewpoints.

30. The method of claim 29, further comprising displaying the resulting video frame.

31. The method of claim 29, including executing the free viewpoint synthesizing process twice for two viewpoints located approximately 6.5 centimeter apart from each other.

32. A processing system for synthesizing video frames starting from source frames of a scene acquired using a multi-viewpoint camera system, the system comprising:
a virtual camera configured to define at least one target virtual viewpoint and compute a corresponding projection matrix for the target virtual viewpoint and a corresponding projection matrix for each source viewpoint;
a projection module configured to project pixels of source frames from the source viewpoints to the target virtual viewpoint as respective contributions to a resulting video frameusing the projection matrixes wherein projecting pixels of source frames from the source viewpoints to the target virtual viewpoint includes, in a presence of a sequence of consecutive pixels in a same row or column of a source frame having a same depth value:
computing a projection of a first and last pixel in the sequence; and
when the consecutive pixels, once projected, have a same distance as in the source frame, copying all the other pixels in the sequence to the target virtual viewpoint between the two projected pixels;
a merging module configured to merge the contributions to the resulting video frame;
an occlusion solving module configured to fill occlusions in the resulting video frame; and an artifact combating module configured to combat artifacts in the resulting video frame.

33. The system of claim 32 wherein the artifact combating module comprises a boundary matting stage configured to mat boundaries.

34. The system of claim 32 wherein the projection module is configured to selectively omit projecting for pixels in borders around objects in the source frames under control of the artifact combating module.

35. The system of claim 32, including a filtering module configured to mask remaining artifacts and reduce pixelation effects due to the projecting in the resulting video frame.

36. The system of claim 32, wherein the system is configured in a form of a pipelined processor.

37. The system of claim 36 wherein:
a first stage in the pipelined processor includes the virtual camera and the projection module;
a second stage in the pipelined processor includes the merging module; and
a third stage in the pipelined processor includes the occlusion solving stage.

38. The system of claim 37 wherein the third stage in the pipelined processor further incorporates a boundary matting module configured to mat boundaries in combating artifacts in the resulting video frame.

39. The system of claim 37 wherein the third stage in the pipelined processor further incorporates a filtering module configured to mask remaining artifacts and reduce pixelation effects due to the projecting in the resulting video frame.

40. A non-transitory computer program product, loadable in a memory of at least one computer and including software code portions for performing a method of rendering video frames starting from source frames of source viewpoints of a scene acquired from a multi-viewpoint camera system, the method comprising:
defining at least one target virtual viewpoint for synthesis and computing a corresponding projection matrix for the target virtual viewpoint;
computing a corresponding projection matrix for each source viewpoint;
projecting pixels of the source frames from the source viewpoints to the target virtual viewpoint as respective contributions to a resulting video frame, wherein the projecting uses the projection matrixes corresponding to the source viewpoints and the target virtual viewpoint; and
merging the contributions to the resulting video frame, wherein the contributions include holes due to integer rounding in projecting pixels from the source frames, the method including filling the holes by assigning to a pixel or pixels in a hole an average value of pixels located at two extremities of the hole.

41. The non-transitory computer program product of claim 40 wherein the method further comprises combating artifacts in the resulting video frame.

42. A video rendering system to render video from source frames acquired from a multi-viewpoint camera system, the rendering system comprising:
a projection module configured to compute virtual camera projection matrixes and project pixels into target virtual viewpoints based on the virtual camera projection matrixes; and
a blending module configured to blend together contributions of multiple source views to obtain output frames, wherein the contributions include holes due to integer rounding in projecting pixels from the source frames, the blending module being configured to fill the holes by assigning to a pixel or pixels in a hole an average value of pixels located at two extremities of the hole.

43. The video rendering system of claim 42, further comprising a refinement module to refine the output frames.

44. The video rendering system of claim 43 wherein the projection module is configured to detect boundaries of input texture frames.

45. The video rendering system of claim 43 wherein the projection module is configured to project pixels into target virtual viewpoints based on depth information.

46. The video rendering system of claim 43 wherein the refinement module is configured to filter the output frames.

47. The video rendering system of claim 43 wherein the refinement module is configured to process boundary information to mask artifacts.

48. The video rendering system of claim 42 wherein the projection module is configured to project pixels to a target virtual viewpoint based on a set of projection matrixes including a projection matrix for each source view corresponding to the target virtual viewpoint.

49. The video rendering system of claim 43 wherein the refinement module is configured to fill occlusions in the output frames.

50. A method of rendering video frames starting from source frames of a scene acquired using a multi-viewpoint camera system, the method comprising:
defining at least one target virtual viewpoint for rendering and computing a corresponding projection matrix for the video frames to the target virtual viewpoint;
projecting pixels from the source frames to the target virtual viewpoint as respective contributions to a resulting video frame, wherein the projecting is based on the projection matrix;
merging the contributions to the resulting video frame; and
filling occlusions and combating artifacts in the resulting video frame, wherein the contributions include holes due to integer rounding in projecting pixels from the source frames, the method including filling the holes by assigning to a pixel or pixels in a hole an average value of pixels located at two extremities of the hole.

* * * * *